United States Patent
Catalli et al.

(10) Patent No.: US 11,304,110 B2
(45) Date of Patent: Apr. 12, 2022

(54) ANTENNA KEYHOLE MANAGEMENT IN WIRELESS RADIO COMMUNICATION

(71) Applicant: Fluidmesh Networks S.r.l., Milan (IT)

(72) Inventors: Gaetano Catalli, Florence (IT); Alessandro Erta, Licciana Nardi (IT); Luca Bisti, Grosseto (IT); Umberto Malesci, Milan (IT)

(73) Assignee: Cisco Technology, Inc., San Jose, CA (US)

(*) Notice: Subject to any disclaimer, the term of this patent is extended or adjusted under 35 U.S.C. 154(b) by 13 days.

(21) Appl. No.: 17/031,317

(22) Filed: Sep. 24, 2020

(65) Prior Publication Data
US 2021/0099941 A1    Apr. 1, 2021

(30) Foreign Application Priority Data
Sep. 27, 2019 (EP) .................................. 19200021

(51) Int. Cl.
*H04W 36/30* (2009.01)
*H04B 17/318* (2015.01)
(Continued)

(52) U.S. Cl.
CPC .......... *H04W 36/30* (2013.01); *H04B 17/318* (2015.01); *H04B 17/382* (2015.01); *H04W 36/385* (2013.01)

(58) Field of Classification Search
CPC ............... H04W 84/005; H04W 36/08; H04W 36/0016; H04W 36/0085;
(Continued)

(56) References Cited

U.S. PATENT DOCUMENTS

2015/0131618 A1* 5/2015 Chen ................. H04B 7/15
370/332
2015/0181502 A1* 6/2015 Hans ................. H04W 36/0009
455/437

FOREIGN PATENT DOCUMENTS

| EP | 1601136 | 11/2005 |
|---|---|---|
| EP | 2840836 | 2/2015 |
| WO | 2003107704 | 12/2003 |

OTHER PUBLICATIONS

Chizhik, et al., "Keyholes, Correlations, and Capacities of Multielement Transmit and Receive Antennas", IEEE Transactions on Wireless Communications, vol. 1, No. 2, Apr. 2002, pp. 361-368, IEEE.

(Continued)

*Primary Examiner* — Quoc Thai N Vu
(74) *Attorney, Agent, or Firm* — Behmke Innovation Group LLC; Kenneth J. Heywood; Jonathon P. Western

(57) ABSTRACT

In one embodiment, a mobile receiver of a mobile station in communication with a current base station of a plurality of base stations receives hello packets from one or more base stations the plurality of base stations, each hello packet including a base station identifier that identifies which base station transmitted that packet. The receiver determines, based on the hello packets, signal strength values associated with each of the plurality of base stations. The receiver periodically analyzes the signal strength values associated with the current base station, to determine whether those signal strength values exceed a threshold value associated with the current base station.

20 Claims, 10 Drawing Sheets

(51) Int. Cl.
*H04B 17/382* (2015.01)
*H04W 36/38* (2009.01)

(58) Field of Classification Search
CPC ........... H04W 36/00835; H04W 36/16; H04W 36/18; H04W 36/30; H04W 36/385; H04W 4/42; H04W 88/085; H04B 17/318; H04B 17/382
See application file for complete search history.

(56) References Cited

OTHER PUBLICATIONS

Moreno, et al., "Keyhole Estimation of an MIMO-OFDM Train-to-Wayside Communication System on Subway on Subway Tunnels", IEEE Antennas and Wireless Propagation Letters, vol. 14, Jan. 2015, p. 88-91, IEEE.

Guizzo, Erico, "Network From the Rooftop", online: https://www.technologyreview.com/2003/08/29/234123/networking-from-the-rooftop/, Aug. 2003, 9 pages, MIT Technology Review.

* cited by examiner

ANTENNA KEYHOLE MANAGEMENT IN WIRELESS RADIO COMMUNICATION

RELATED APPLICATION

This application is claims priority to EP Appl. No. 19200021, filed Sep. 27, 2019, entitled ANTENNA KEYHOLE MANAGEMENT IN WIRELESS RADIO COMMUNICATION, by Catalli et al., the contents of which are incorporated herein by reference.

TECHNICAL FIELD

The present disclosure relates generally to computer networks, and, more particularly, to antenna keyhole management in wireless radio communication.

BACKGROUND

Cellular network coverage has made Internet connectivity increasingly ubiquitous. This has lead to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a is reliable wireless ground-to-vehicle communication.

The propagation of radio waves in tunnels employing multiple-input, multiple-output (MIMO) communications may suffer from the appearance of keyholes. In general, a "keyhole" refers to a phenomenon in MIMO telecommunication channels for which the propagation of multipath signals from the transmitter side to the receiver side is mostly hindered except for a narrow area between two sides. In other words, a keyhole happens when the channel transfer matrix has a low spatial correlation and a low rank. The occurrence of a keyhole leads to a severe degradation of the MIMO performance even when transmitter and receiver antennas are uncorrelated, and the MIMO channel capacity may be reduced to that of single-input, single-output (SISO) communication.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a mobile receiver of a mobile station in communication with a current base station of a plurality of base stations receives hello packets from one or more base stations the plurality of base stations, each hello packet including a base station identifier that identifies which base station transmitted that packet. The receiver determines, based on the hello packets, signal strength values associated with each of the plurality of base stations. The receiver periodically analyzes the signal strength values associated with the current base station, to determine whether those signal strength values exceed a threshold value associated with the current base station. When the current base station is associated with a signal strength value exceeds the threshold value, the receiver flags the current base station as a is banned base station, selects a neighboring base station of the current base station in the plurality of base stations as a new current base station, based on its associated signal strength values, and forces a handoff of the mobile station from the banned base station to the new current base station at a handoff time.

Description

The present disclosure will be now described more fully hereinafter with reference to the accompanying drawings, in which some, but not all embodiments of the invention are shown. Drawings illustrating the embodiments are not-to-scale schematic representations.

For the purpose of the present description and of the appended claims, except where otherwise indicated, all numbers expressing amounts, quantities, percentages, and so forth, are to be understood as being modified in all instances by the term "about." Also, all ranges include the maximum and minimum points disclosed and include any intermediate ranges therein, which may or may not be specifically enumerated herein.

As noted above, public transportation systems are increasingly providing high-speed data connections to their passengers. In addition to this, Intelligent Transportation Systems (ITS) are also emerging, which requires a new generation of services for control, automation, and monitoring. Consequently, the implementation of real-time video surveillance for remote surveillance of trains and the installation of a large number of sensors and actuators for remote diagnostic and telemetry will demand for broadband connectivity that can ensure reliability, customizable Quality of Service (QoS) and high bandwidth.

Figure 1:
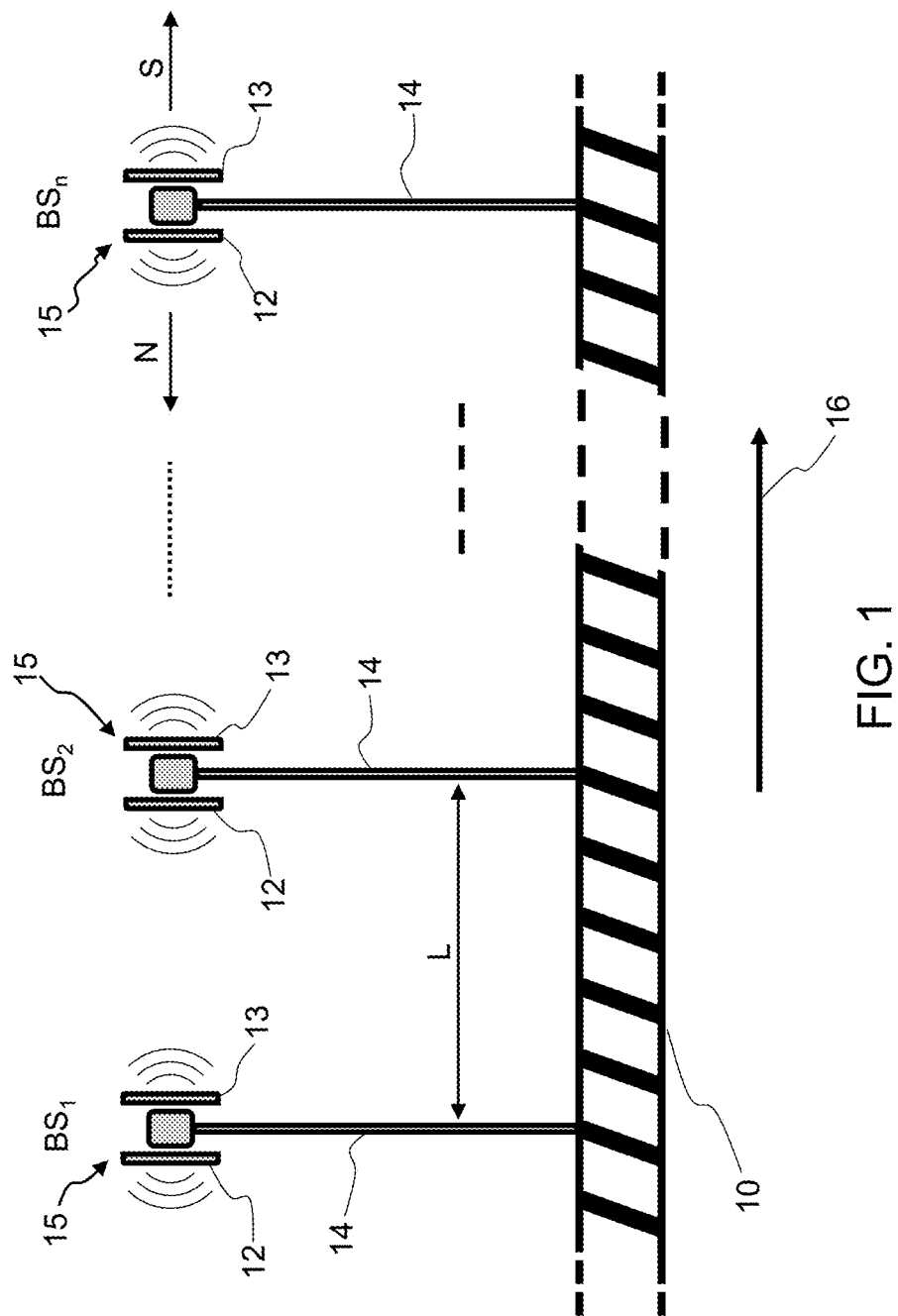
FIG. 1 illustrates an example of a railway along which a plurality of radio base stations is arranged.

FIG. 1 illustrates an example diagram of a pathway along which a plurality of wayside base stations is arranged, spatially separated from one another along the pathway. In particular, the wayside antenna system comprises a plurality of base stations 15 denoted $BS_1$, $BS_2$, . . . , $BS_n$ that are located along pathway 10 (e.g., a railway), at a distance L from one another, with L being a constant or a variable value. Pathway 10 may take the form of a line or curved track, with direction 16 indicating the motion of movement of a vehicle along pathway 10.

In a typical configuration, each base station $BS_i$, i=1, 2, . . . , n, is equipped with a radio transmitter (not indicated in the figure) having a wayside antenna group mounted on a freestanding mast 14. Atop each mast 15 may be two separate directional antennas 12, 13 pointing in two opposite directions along pathway 10. The two opposite directions of the wayside antennas may be referred in the following description to as "north" and "south" or "north antenna" and "south antenna," assuming a north-south moving direction 16. However, no specific meaning, such as a geographic relative location should be associated to these terms, which are meant to indicate merely two opposite directions along a pathway, denoted with arrows N (North) and S (South) in FIG. 1. In practice, one of the N and S directions is the travelling direction of the moving vehicle.

Wireless communication in high-speed vehicular mobility scenarios, such as the one illustrated in FIG. 1, poses complex technical challenges across several layers of the ISO-OSI stack, including the physical layer and the Medium Access Control (MAC) layer. The physical layer specifies the actual modulation/demodulation technique used to transmit packets over the air. Distortion effects like the Doppler effect may negatively impact the performance of the physical layer. Modern modulation techniques like Orthogonal Frequency Division Multiplexing (OFDM) can reduce the impact of distortive phenomena on the channel and, thus, allow obtaining good transmission performance even in high-speed vehicular communication scenarios. Multiple-input multiple-output (MIMO) wireless communication systems, which employ multi-element antenna arrays at both the transmitter and the receiver side, has proved to be an effective technology to provide large bandwidth in harsh environments, such as railways tunnels, especially when combined with OFDM.

Typically, railway communications deploy a wireless local area network (WLAN), such as Wi-Fi or WiMAX, within the train so that passengers are connected to the Internet via a Wi-Fi connection. A Wi-Fi standard rely on a MIMO-OFDM physical layer operating at 5 GHz, which provides good throughput performance at several miles distance using fairly directive antennas on the trackside. Wi-Fi technology can be based on standards IEEE 802.11.

Recently, 3GPP LTE (Long Term Evolution) and LTE-A (LTE-Advanced) have been proposed as standards for railway communications. A key feature in LTE and LTE-A is the MIMO technology. In particular, LTE-A can support up to 8×8 antennas in the downlink and 4×4 antennas in the uplink.

Proprietary solutions for providing on board Internet access in trains have also been developed. For instance, FLUIDITY™ is a transmission protocol that is a license-free trackside wireless protocol operating in the 5 GHz band. The system relies on a 2×2 MIMO-based radio technology and dual-polarized trackside and on-board antennas.

The propagation of radio waves in tunnels employing the MIMO technology may suffer from the appearance of keyholes. The term "keyhole" refers to a phenomenon in MIMO telecommunication channels in which the propagation of multipath signals from the transmitter side to the receiver side is mostly hindered except for a narrow area between two sides. In other words, a keyhole happens when the channel transfer matrix has a low spatial correlation and a low rank. The occurrence of a keyhole leads to a severe degradation of the MIMO performance even when transmitter and receiver antennas are uncorrelated, and the MIMO channel capacity may be reduced to that of SISO (single-input single-output) communication.

In order to ensure a continuous connection, base stations, generally referred also to as "wireless access points" (APs), are appropriately deployed along the railway. The train-to-wayside wireless communication can rely on existing network infrastructure, such as that of public cellular networks, or on a specific, dedicated network infrastructure.

The techniques introduce herein address the problem of keyholes in wireless radio is communication between an on-board radio station in a vehicle traveling along a pathway and a plurality of fixed wayside radio stations arranged along the pathway. In the following description and claims, the fixed radio stations arranged along the pathway are referred to as "radio base stations" or "base stations" or "wayside (radio) base stations."

Radio signals transmitted from a base station may be fed through cables to one or more antennas and then launched as radio waves into an area around the base station. Generally speaking, the area for which the base station is designed to provide coverage, indicated in the following as radio coverage area, depends on the power of the transmitter of the base station. The plurality of fixed wayside base stations is arranged along the pathway in such a way that the radio coverage area of near adjacent base stations partially overlap one another at least in the direction of the pathway, resulting in a coverage redundancy in the travelling direction of the moving vehicle.

Figure 2:
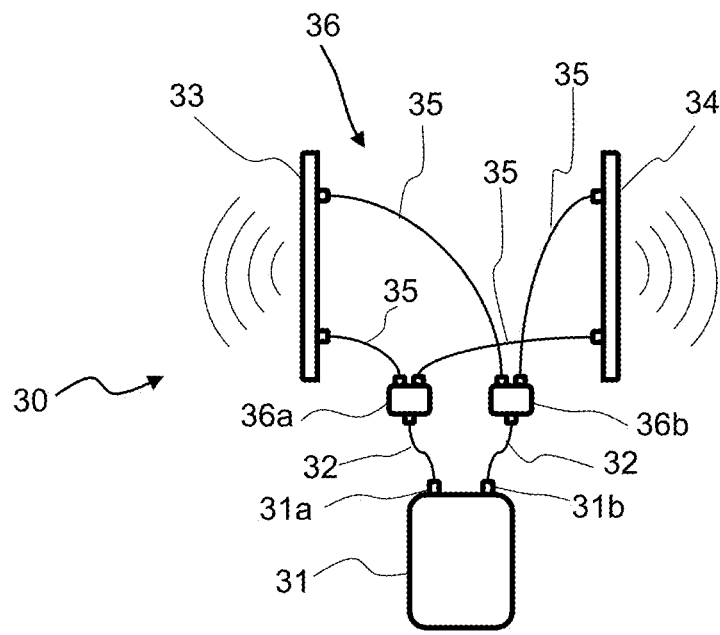
FIG. 2 illustrates an example wayside radio base station, according to an exemplary embodiment of the present invention.

By way of example, FIG. 2 shows a base station 30 configured to support MIMO 2×2 wireless communication. The RU 31 has two input/output ports 31a, 31b, each configured to receive and output RF signals. Each input/output port 31a, 31 b is connected, e.g. via coaxial cables 32, to a respective RF signal splitter 36a, 36b. Each splitter 36a, 36b divides the RF signal emitted from the RU 31 into two signals to be directed to the respective first and second directional antennas 33, 34 for the signal transmission. Analogously, the RF signals received from each antenna are sent through either splitter 36a, 36b to the RU 31. Each splitter is connected to both antennas 33, 34 by means of a respective coaxial cable 35. The two input/output ports 31a, 31b are used for both transmission and reception, at different sampling times, as typical in Wi-Fi protocols. Preferably, each directional antenna 33, 34 is a dual polarized MIMO panel antenna for transmitting and receiving RF signals having polarization diversity. For example, maximum powers for individual transmitters in the wayside base stations are about 0.05 to 1 watts (W), although the total radiated power from an antenna could be up to 0.2 W when multiple transmitters are present in a single base station.

In the example shown in FIG. 2, as both antennas 33, 34 are connected to the is wayside RU 31 through RF signal splitters 36a, 36b, transmission and reception of RF signals from/to the RU 31 cannot distinguish between the signals from the north or south antenna 33, 34. More generally, in the following, reference will be made to transmission and possibly reception of radio signals from/to a base station, which comprises an antenna system coupled to a wayside radio unit, in particular to a wayside radio transceiver.

As the on-board radio station travels, it receives radio signals that vary in strength from the neighbor base stations and handoff processes are typically needed to keep a wireless connection active. Consistently with its general meaning, with "handoff" it is meant within the present description and claims the process of switching a radio communication link from a current base station to a neighbor base station.

A handoff scheme of the type which selects a base station having the best communication condition among neighbor base stations, in most cases, would not solve a massive fall in data transfer rate at the keyhole. A key observation herein is that the keyhole effect generally occurs approximately at the location of the wayside antennas, generally corresponding to the location of the mast of each base station, where the transmitted signal is at or close to the peak values.

In some embodiments, the keyhole effects at the proximity of a base station can be considerably reduced by forcing the on-board radio station to be temporarily banned from connecting to that very base station when the received signal strength is above a given threshold and by establishing a connection with a neighbor base station, which is deemed not to be affected by a keyhole effect. The neighbor base station, which is often but not necessarily is the next nearest base station in the moving direction, may have (and typically has) a lower signal strength than that of the banned base station, at the time of banning. Nonetheless, the adverse effects in data transfer rate from/to the on-board radio unit at the keyhole are avoided or at least mitigated.

In the following description and claims, the moving radio station, typically an on-board radio station, is referred to as mobile radio station and the antenna(s) of the mobile radio station to as mobile or moving antennas.

FIG. 2 illustrate some main components of a wayside radio base station, according to an exemplary embodiment. Base station 30 comprises a wayside radio unit (RU) 31 and an antenna system 36 connected to the radio unit. The antenna system 36 has two directional antennas 33, 34. As customarily, the wayside RU 31 comprises a transmitter and a receiver, i.e. a transceiver (not shown), respectively configured to transmit and receive radio electromagnetic signals, in particular radio frequency (RF) signals, more particularly RF signals adapted to operate in a Wi-Fi band. Other typical components may be included in the RU 31, such as RF electronic filters and amplifiers and processing circuitry including the functionalities for wireless network access via the transmitter/receiver as well as functionalities for processing data/signals.

The wayside base stations can be mobile phone base stations of existing public cellular networks or being part of a dedicated infrastructure. In base station 30, radio signals are fed through cables to the antennas and then launched as radio waves into the radio coverage area around the base station.

Preferably, the wayside base stations are part of a dedicated network infrastructure. In an embodiment, the base stations support the U-NII (Unlicensed National Information Infrastructure) band at 5 GHz using the IEEE 802.11 medium access control (MAC) and physical layer (PHY) specifications.

Preferably, the wayside base stations use a same frequency channel for the radio communication with the on-board radio station.

Figure 3:
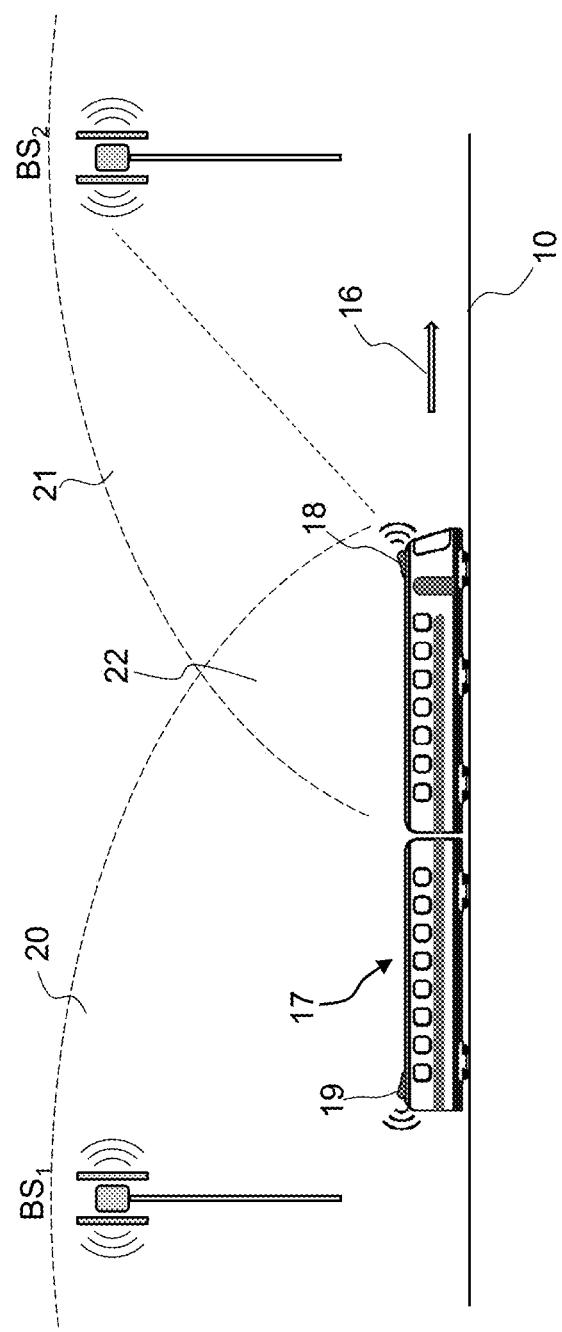
FIG. 3 is an example diagram of a train-to-ground wireless connection.

FIG. 3 is a pictorial diagram of a train-to-ground wireless connection. A train 17 is moving in travelling direction 16 along a rail track 10, along which a plurality of wayside base stations $BS_1, BS_2, \ldots$ are arranged. The train 17 is equipped with an on-board mobile radio station (not indicated in the figure) communicatively coupled to at least one on-board mobile antenna, which is preferably designed to create a directional radiation pattern.

In a preferred, non-limitative configuration, the mobile radio station comprises two mobile radio units, RUs, (not shown) respectively connected to a mobile antenna 18, 19 located on the top of the train, at the beginning and at the end of train 17. In a usual configuration, a first directional antenna 18 is placed on the head coach of the train 17 and a second directional antenna 19 is placed on the tail coach, respectively. The directional antennas 18, 19 face opposite directions, namely the first antenna at the front of the train 17 points the travelling direction 16 of the train, taken as the positive direction, while the second antenna 19 points a direction opposite to the travelling direction 16. The mobile radio station is placed on-board of the train and moves together with the train, possibly at a relevant speed such as in case of high-speed trains, e.g. 250-350 km/h. Each mobile RU comprises a mobile receiver and a mobile transmitter.

Each of wayside base stations $BS_1, BS_2, \ldots$, defines a radio coverage area of radio communication, which is pictorially illustrated with areas 20 and 21. In order to ensure a proper connectivity, a radio coverage model typically needs an arrangement of the base stations along the pathway such as the coverage regions of near adjacent base stations partially overlap one another in the direction of the pathway, resulting in a coverage redundancy. In the example, near adjacent base stations $BS_1$ and $BS_2$ are placed at a distance L one from another such that an overlapping area 22 exists between radio coverage area 20 and radio coverage area 21.

Under this model, at each instant, at least one mobile radio receiver of the two mobile radio receivers of the corresponding radio units on board the moving train receives a radio signal from at least one neighbor base station. Due to coverage redundancy, a mobile radio receiver, at a certain instant, may receive an RF signal from more than one base station, such as from two or more neighbor base stations. In particular, at each instant, the mobile RU (each mobile RU in case of more than one RU) is in radio communication with a number of wayside base stations, in the present description and claims referred to as neighbor base stations. Non-neighbor base stations are those base stations of the plurality of wayside base stations, which, at the instant or time frame considered, either do not transmit or transmit signals that are low enough to be considered noise. The plurality of neighbor base stations of a mobile radio unit can be is a sub-plurality of the base stations $BS_y$ (y=1, . . . , N) deployed along the pathway, typically a small number M<N, for example from 2 to 4 base stations.

Figure 4:
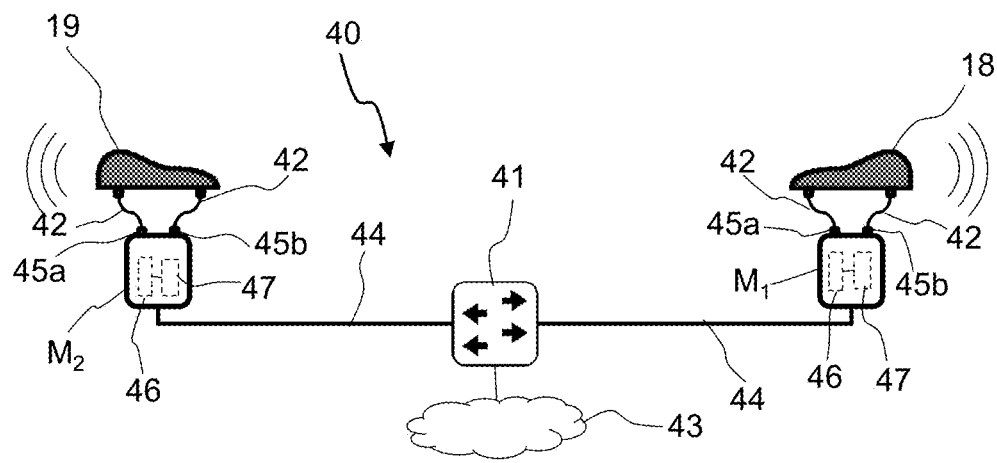
FIG. 4 illustrates an example on-board scheme of a mobile radio station mounted in a vehicle, according to an exemplary embodiment of the invention.

FIG. 4 illustrate an on-board scheme of a mobile radio station mounted on a train, according to an exemplary embodiment of the invention. The mobile radio station 40 comprises a first mobile radio unit (RU) $M_1$ and a second mobile RU $M_2$, each RU being configured to transmit and receive radio signals, in particular RF signals, by means of a respective transmitter and receiver, indicated as transceiver 46. In particular, the first mobile RU $M_1$ comprises a first mobile receiver and the second mobile RU comprises a second mobile receiver.

Each RU $M_1$, $M_2$ comprises a respective electronic processor 47, which includes the functionalities for wireless network access via the transceiver 46 as well as functionalities for processing data/signals as described herein. Electronic processor can be a microprocessor, such as a microprocessor having a MIPS (Microprocessor without Interlocked Pipeline Stages) or an x86 architecture.

The first mobile RU $M_1$ is connected to a first moving antenna 18, which is designed to create a directional radiation pattern. The second mobile RU $M_2$ is connected to a second moving antenna 19, which is designed to create a directional radiation pattern. As customarily, $M_1$ and $M_2$ may be connected respectively to the first and the second moving antenna 19 through two RF connectors 45a, 45b via respective coaxial cables 42. Various RF connectors can be used including N-type, SMA, RP-SMA, QMA, etc.

Preferably, each of the first and the second moving antenna 18, 19 is a MIMO 2×2 dual-polarized antenna, such as a shark-fin antenna.

First and second antennas 18, 19 are mounted on the train so that their radiation patterns point two opposite directions, one of the two opposite directions being in the travelling direction.

The first and the second mobile radio units $M_1$, $M_2$ are operatively connected to an on-board network system 43 for signal distribution and/or access.

The network system 43 may be a wireless local area network (W-LAN) that include typical devices for signal distribution and/or wireless access, such as one or more wireless routers, a modem and a plurality of Wi-Fi access points to be deployed within the train in order to allow wireless devices, such as smartphone or tablets, to access the Internet by using the on board network system 43, in particular for broadband applications.

It is however to be understood that radio communication can be instead tailored to implement an automatic train control system that makes use of telecommunications between a mobile radio station installed in the train and the base stations on the ground for traffic management and infrastructure control. In this case, a system for Communications-based train control (CBTC) signal management with an integrated wireless communication network system 43, typically based either on the Wi-Fi standard, a wired CBTC communication system, or on a proprietary technology.

Preferably, the mobile radio units $M_1$, $M_2$ communicate with the network system 43 through a communication interface 41, in particular an Ethernet switch, such as an N-port Ethernet switch. More generally, the communication interface 41 is configured to provide cabled connectivity among the on-board network devices including the mobile base stations and Wi-Fi access points.

At each instant, the radio communication between a mobile RU and a wayside base station can be represented by a pair $<M_x, BS_y>$, where $M_x$ is the mobile RU, with x=1, 2 in the present embodiment, and y=1, 2, 3, . . . , N, where N is the number of base stations deployed along the pathway travelled by the train. For convenience only, in describing the system and method, increasing indices of y are taken along the moving direction. The pair $<M_x, BS_y>$ can be seen as a combination of nodes defining a radio communication.

Each wayside base station $BS_y$ is configured to periodically transmit hello packets. Identity information of a hello packet is represented by a unique identifier identifying the base station, $ID-BS_y$. The information on the signal strength emitted from is a base station may be represented by an RSSI value, such as $RSSI_y$, for signals received from base station $BS_y$. In case of more than one mobile RU, the $RSSI_{xy}$ value is the RSSI value received from mobile RU $M_x$ from base station $BS_y$.

The periodical transmission of hello packets may take place in a frame of unsolicited data packet broadcast, according to known standards in wireless communication, for example in Wi-Fi standards IEEE 802.11. For example, each wayside base station may be configured to transmit hello packets with a periodicity of 10 packets per second.

In another embodiment, the mobile radio unit $M_x$ is configured to perform neighbor discovery, by monitoring continuously the signals received from the neighbor base stations, for example by using known discovery protocols of wireless communication standards. The transmitter of each mobile RU is configured to repeatedly transmit discovery requests, such as probe requests or probe request frames in case of standards IEEE 802.11, to inform the neighbor base stations about its existence. Neighbor base stations are configured to respond to the probe request frames by transmitting solicited hello packets, which are received by the receiver of a mobile RU.

Each mobile RU, by means of processor 47, is configured to measure the RSSI values of the hello packets received from the mobile receiver 46 and to store the measured RSSI values with the associated base station identifiers in a neighbor table as table entries. The base stations included in the neighbor table are neighbor base stations and are in general handoff candidate base stations.

In general, the greater the distance between a wayside base station (in particular the transmitter of the base station) and the (antenna of the) mobile RU, the lower the RSSI value of the hello packet received by the receiver of the mobile RU. As the mobile RU travels, the received hello packets from the neighbor base stations vary in strength and this causes the processor to change the signal strength values stored in the neighbor table. When the mobile radio station comprises more than one mobile RU, the neighbor table stores also the information of which RU is receiving the hello packets as an entry is having the identity information of the radio unit $M_x$ associated with the RSSI value and the corresponding identifier of the neighbor base station.

The neighbor table may be stored in a memory space operatively coupled with the processor or part of the processor.

Preferably, at each instant in time, the wireless communication between a wayside base station and the on-board radio station 40 takes place on a single communication link. In particular, at a certain instant of time, a single communication link, indicated as the current link, is established between one wayside base station and one radio unit of the mobile radio station.

Preferably, one of the radio units, in particular one of the two electronic processors 47, is elected as master of the execution of the software code that stores the signal strength values associated with respective base stations for the iterative analysis of the stored RSSI values to select a base station for the handoff from a current base station. The processor 47 selected as master is hereafter referred to as master processor. The other processor 47 is indicated as slave processor. Both the master and slave RU processors 47 are configured to receive radio signals, such as hello packets, from the respective radio unit and to determine the RSSI values of the received hello packets. In a master-slave configuration, the neighbor table is preferably stored in a non-transitory memory space operatively coupled with the master processor or part of the master processor. The slave processor measures the RSSI of the received hello packets and transmits in real time the determined RSSI values to the master processor that then enters them into the neighbor table. In practice, the neighbor table is updated by means of a table update procedure run by the master processor anytime a hello packet, which comprises a base station identifier of the base station transmitting it, is received by either mobile RU.

Transmission of the data from the slave processor to the master processor may take place through the on-board switch 41 via the cabled connection 44. In this way, the master processor can "master" the handoff process for both radio units.

The designation of a RU as master and thus of the other RU as slave may take place automatically at the initialization of the mobile radio station, e.g. when the mobile radio station is powered up, according to known algorithms, such as election algorithms, for example a Bully Algorithm.

The same hello packet may be received by both radio units $M_1$ and $M_2$ and each RU may measure a different signal strength due to the different distance of the RU from the base station emitting the hello packet. The slave RU will transfer the data based on the received hello packet to the processor of the master RU, which inputs the information into the neighbor table.

It is to be understood that, in a mobile radio station having more than two radio units, a master RU may have any number of slave RUs.

Table 1 is a conceptual example of neighbor table reporting values of $RSSI_{xy}$, associated with the base station identifier ID-$BS_y$ (y=1,2, ..., N) as received by either of the mobile radio units $M_1$, $M_2$, the radio unit being identified by a mobile radio unit identifier ID-$M_x$ x=1, 2.

TABLE 1

| Mobile RU | Base Station ID | RSSI value |
|---|---|---|
| ID-$M_1$ | ID-$BS_2$ | $RSSI_{12}$ |
| ID-$M_2$ | ID-$BS_1$ | $RSSI_{21}$ |
| ID-$M_1$ | ID-$B5_3$ | $RSSI_{13}$ |

The neighbor table is preferably a dynamic table automatically updated when a new hello data packet is received by one or both the mobile radio units.

A new row is added in the table when the entry pair <$M_x$, $BS_y$> is not present in the table (i.e. no existing radio communication between $M_x$ and $BS_y$) or an existing row representing the radio communication <$M_x$, $BS_y$> is updated when a new value of RSSI is measured by the mobile receiver $M_x$ in the hello packet from $BS_y$. To this purpose and in ways per se known, the master processor 47 is configured to automatically enter, in real time at the reception of a hello packet the new information in the table. The slave processor may send the information on the $RSSI_{xy}$ values as entry pair <$M_x$, $BS_y$> to the master processor.

When a mobile RU moves away from a base station, eventually it will not receive is hello packets from that base station, which has become a non-neighbor station. The master processor may be configured to delete a row from the neighbor table if the value of the RSSI of that row has not been updated for a preset time. In an embodiment, the table may include a timestamp, e.g. stored in an additional column, associated to the time at which the RSSI value has been entered and, when a preset time interval between the time and the actual time is larger than a predetermined time value, the row containing the "old" RSSI value is deleted from the table.

In a typical configuration, while moving, the mobile radio station keeps the connection with the wayside infrastructure by using a handoff scheme between neighbor base stations, usually based on the best signal strength. In particular, the radio receivers of the mobile RUs measure the received signal strength over time and the base station with the strongest signal is selected for the handoff and establishment of a direct communication link with the mobile RU.

Figure 5:
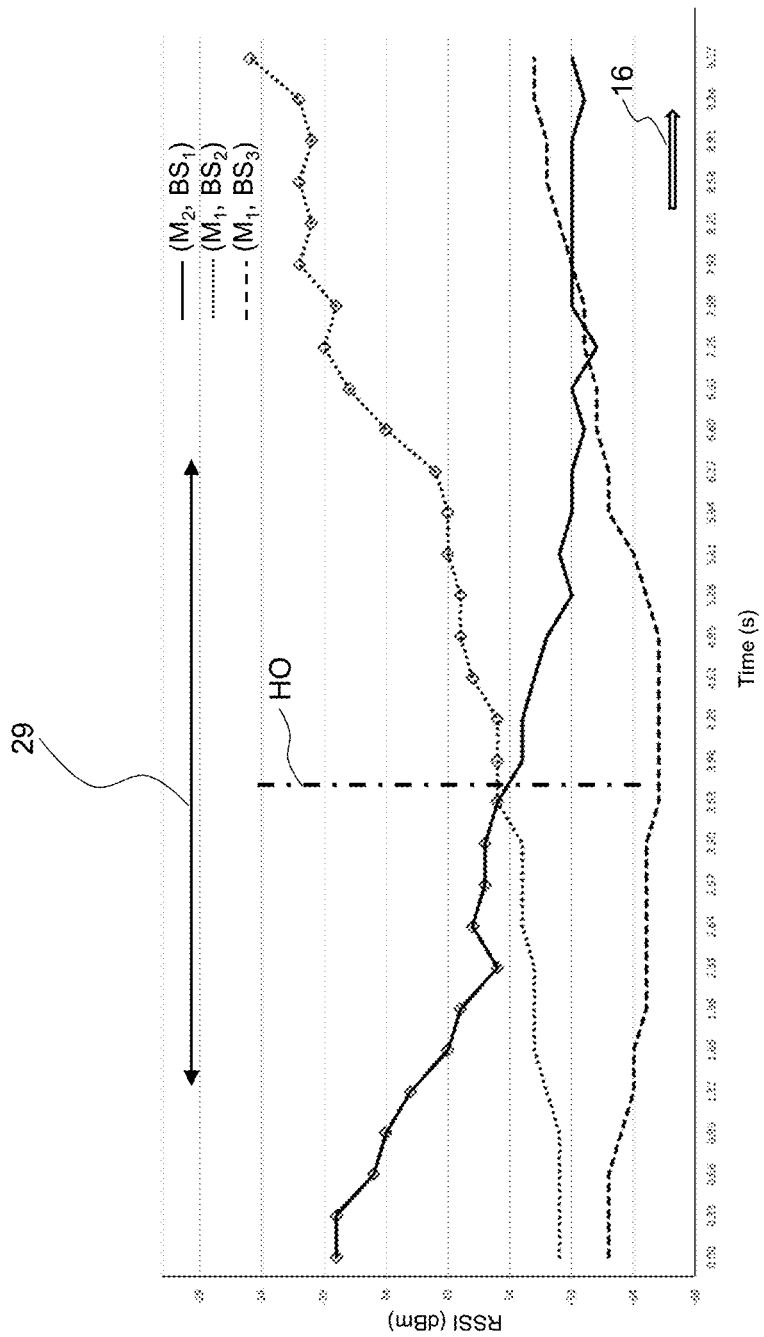
FIG. 5 illustrates an example graph reporting the downlink signal strength of is wayside base stations.

FIG. 5 is a graph reporting an exemplary downlink signal strength (RSSI) vs. time (seconds) received by the first and second mobile radio receiver of the respective mobile radio units $M_1$, $M_2$ installed on a moving train in a subway tunnel, having a configuration similar to the schemes shown in FIGS. 3 and 4. More specifically, FIG. 5 shows the RSSI of wayside base stations (solid, dotted and dashed lines), as a function of time (seconds), as measured by an on-board mobile radio station mounted on a train moving in a subway tunnel, and the current link (diamond symbols) resulting from the application of a handoff algorithm based on the highest RSSI value wherein the best RSSI value is used as a handoff function The wayside infrastructure and the on-board mobile radio station employed a 2×2 MIMO-OFDM setup.

In the section shown in the graph, neighbor base stations for the mobile radio station are $BS_1$, $BS_2$ and $BS_3$. The solid line represents the RSSI from $BS_1$, as received by the second RU $M_2$ from the antenna at the tail of the train (i.e. the train is moving away from the coverage area of $BS_1$). The dotted line is the RSSI of a second base station $BS_2$, positioned near adjacent to $BS_1$ in the moving direction 16, as measured by the first RU $M_1$ receiving the signal from the front antenna at the head of the train. The dashed line represents the RSSI received from $BS_3$ positioned near adjacent to $BS_2$ in the moving direction 16, by the first RU $M_1$.

As seen by the dotted curve, the train is entering the coverage area of $BS_2$ and the signal strength increases as the front antenna approaches the position of $BS_2$, whereas the signal strength of $BS_1$ received by the tail antenna decreases as the train moves away from the position of the $BS_1$. The signal strength of $BS_3$ remains relatively low across the time interval reported in the Figure. At time of about 3.63 seconds the values of RSSI of the pair <$M_2$, $BS_1$> and that of <$M_1$, $BS_2$> are about the same, indicating that the train is at a middle position between $BS_1$ and $BS_2$.

In the example shown in FIG. 5, a handoff algorithm is applied based on the highest RSSI value to use as current (communication) link. The diamond symbols overlapping portions of the curves RSSI of $BS_1$ and $BS_2$ represent the current radio link established by the handoff algorithm configured to hand the mobile radio receiver from $BS_1$ to $BS_2$ when the signal strength measured at $BS_2$ exceeds that of $BS_1$. In practice, the neighbor table is repeatedly queried by the master processor to select the pair <$M_x$, $BS_y$> with the highest RSSI value and perform the handoff to the selected pair. Line HO in FIG. 5 approximately indicates the time of handoff from one base station to the next.

Figure 6:
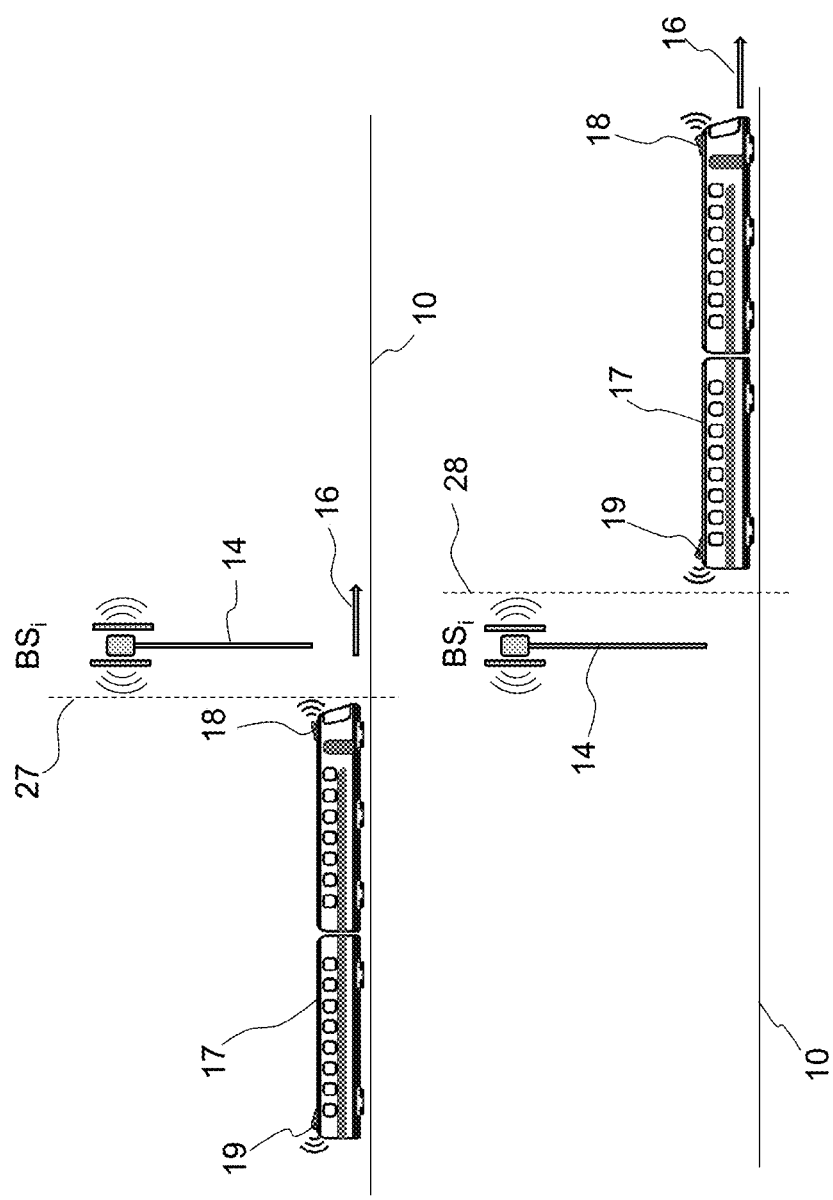
FIG. 6 illustrates an example diagram of the train-to-ground wireless connection at the proximity of a base station.

FIG. 6 is a pictorial diagram of the train-to-ground wireless connection in a tunnel at the vicinity of a base station indicated with $BS_i$. Same numbers indicate the same or similar features shown in previous drawings. The time indicated with line 27 represents approximately the time when the head of the train, by means of moving antenna 18 at the front of the train approaches the mast 14 of base station $BS_i$, and line 28 approximately represents the time when moving antenna 19 at the back of the train moves is away from the mast. Lines 27 and 28 thus pictorially represent the entry point (or ingress point) to the keyhole and the egress point from the keyhole.

Figure 7:
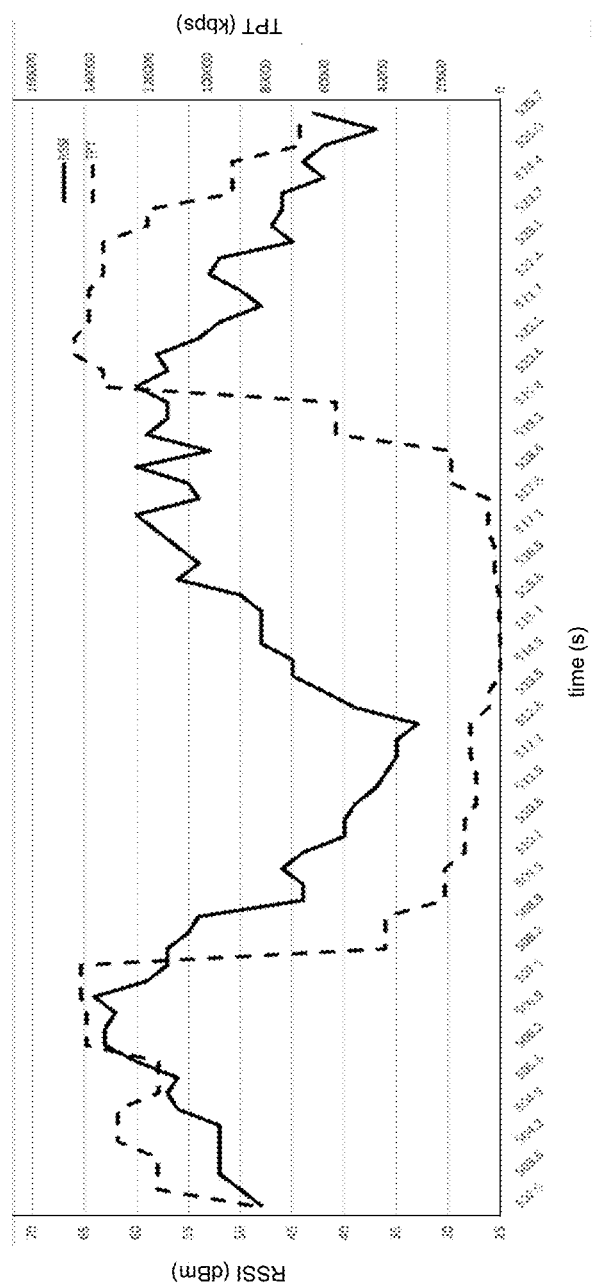
FIG. 7 illustrates an example graph reporting the signal strength of a current link resulting from the application of a handoff algorithm.

FIG. 7 is a graph reporting an exemplary signal strength (RSSI) vs. time (seconds), received by a mobile RU passing across the mast of a wayside base station and represented by a solid line (dBm, left y-axis), resulting from the application of a handoff algorithm based on the highest RSSI value, of the type shown with the curve identified by the diamond symbols in FIG. 5. The signal strength increases as the mobile RU approaches the mast of the base station and then exhibits a sharp fall of a whopping ~30 dBm in the proximity of the mast position, which may represent the entry into the keyhole, indicated with entry line 27 in FIG. 6. The coverage hole lasted for about 9 seconds and then the signal strength increased again to about 55 dBm, when the train exited the keyhole, represented by egress line 28 in FIG. 6. FIG. 7 shows also the transmission data rate in downlink and uplink (bidirectional transmission), namely the data throughput in kbps, to/from the on-board radio unit, represented by a dashed line (right y-axis). At the keyhole, the throughput exhibits a very deep and wide fall down to 0 kbps to increase again after having passed the coverage hole.

An observation can be made that a substantial absence of data transfer at recurring time intervals corresponding to the keyhole occurrences implies a severe degradation of MIMO service performance. By temporarily excluding the current base station from the connection with the on-board radio unit when the mobile radio unit enters the keyhole and then forcing the radio unit to connect with a neighbor base station not affected by the keyhole effect, the two-way wireless communication between the wayside infrastructure and the mobile radio station can be significantly improve.

In particular, a temporary ban of a wayside base station is defined by a threshold value of signal strength associated to that base station. The radio communication link between the mobile radio station and the wayside base station is banned when the signal strength is above the threshold value, indicating that an RU may be close to or at the mast of the base station. With "banning" a base station it is meant prohibiting the mobile RU from connecting that base station in a way that a direct radio link with the excluded base is station is not an option.

Preferably, the handoff procedure uses a neighbor table storing the received signal strength values together with the associated base station identifiers and the RU identifiers. Table 2 is a conceptual example of neighbor table. Each table row includes the RU identifier, the base station identifier and the RSSI value, as previously described with reference to Table 1. Table 2 includes the indication of the presence or absence of a flag ("ban flag"), which indicates whether a base station is excluded or included in the query for a handoff candidate base station. In Table 2, the ban flag is represented as an additional column and the presence or absence of the ban flag is part of the table entries (table row).

Preferably, the neighbor table is a dynamic read table automatically updated when a new hello packet is received by one or both of the mobile interface radio units. For instance:

TABLE 2

| Mobile RU | Base Station ID | RSSI value | Ban flag |
|---|---|---|---|
| ID-M$_1$ | ID-BS$_1$ | RSSI$_{11}$ | |
| ID-M$_2$ | ID-BS$_1$ | RSSI$_{21}$ | |
| ID-M$_1$ | ID-BS$_2$ | RSSI$_{12}$ | x |
| ID-M$_2$ | ID-BS$_2$ | RSSI$_{22}$ | x |
| ID-M$_1$ | ID-BS$_3$ | RSSI$_{13}$ | |
| ID-M$_2$ | ID-BS$_3$ | RSSI$_{23}$ | |

It is to be understood that in case the mobile radio station comprises a single RU or has a different configuration from a master-slave configuration, the operations are carried out either by the processor of the single mobile RU or by a processor in communication with the RUs. In the following description, passages or operations are described with generic reference to an electronic processor, which is, in a master-slave configuration, the master processor for determining the RSSI values of the received hello packets and the management of the handoff procedures or at least one slave processor for determining the RSSI values of the received hello packets and the transmission of said RSSI values associated with the identifiers to the master processor.

To execute the process, in a usual way, the mobile radio unit may comprise a computer-readable storage medium operably connected to the electronic processor, the computer-readable storage medium configured to store instructions executable by the processor and data accessible by the processor.

As previously described, the processor is configured to store in the neighbor table the RSSI values associated with base station identifier ID-BS$_y$ and the RU identifier ID-M$_x$. In Table 2, RSSI$_{xy}$ value and the associated identifiers form a single row.

At a certain instant of time, when the mobile radio station mounted in a vehicle is moving in a travelling direction, the mobile radio station, in particular a mobile receiver of the radio station, is in a radio communication link with a base station as the current base station.

The processor is configured to repeatedly query the neighbor table to determine the current RSSI value, RSSI$_c$, that is the RSSI value of the current base station having established a communication link with the radio station, and to compare the RSSI$_c$ value with a given threshold value of RSSI, TH.

If the RSSI$_c$ is larger than TH, the processor is configured to flag the current base station having an above-threshold signal strength value as excluded ("banned") base station. The flag is added in any table row that includes the banned base station identified by ID-BS. For example, in Table 2, BS$_2$ is banned because RSSI$_{12}$>TH and a flag is set in any table row associated with BS$_2$, in particular any row including the identifier ID-BS$_2$. Consequently, BS$_2$ is not an option for connection for any of the radio units of the mobile radio station even if other RSSI values associated with BS$_2$ are below threshold, for example RSSI$_{22}$<TH.

The flag temporarily blocks future association of a mobile RU of the mobile radio station with the banned base station for a ban time duration, $\Delta t_{ban}$.

Subsequently to flagging the banned base station, the processor is configured to analyze the RSSI values in the neighbor table while ignoring the flagged table rows, in particular the flagged RSSI values. The processor analyses the non-banned table entries to determine the neighbor base station associated with the highest RSSI value in the neighbor table as the destination neighbor base station. The highest RSSI value is in many instances, but not necessarily, the second-best values after the values of the banned base station for a specific time interval.

Upon determination of the highest RSSI value among the non-banned entries, the processor is configured to force the mobile receiver or mobile receivers, if more than one, into a temporary handoff from the current base station to the destination base station.

The processor, when the ban time duration has ended, is configured to remove the flag from the table row(s) relative to the banned base station so that a radio communication link may be established between that (formerly banned) base station and the mobile radio station. The end of the ban time duration $\Delta t_{ban}$ defines a time that is approximately indicative of the egress point of the keyhole.

Although in many instances the mobile receiver may connect to the last-banned base station, because its current position is still in the proximity of that base station and thus it receives an RF signal with a high RSSI, the handoff procedure does not exclude establishing a radio link with a base station other than the last-banned base station. Preferably, at the end of the ban time duration, the processor is configured to search for the best RSSI value among all the neighbor base stations by querying the neighbor table.

Preferably, the processor, by repeatedly querying the neighbor table, is configured to repeat the process of temporarily banning a neighbor base station every time a current RSSI value larger than a TH value is detected.

Figure 8:
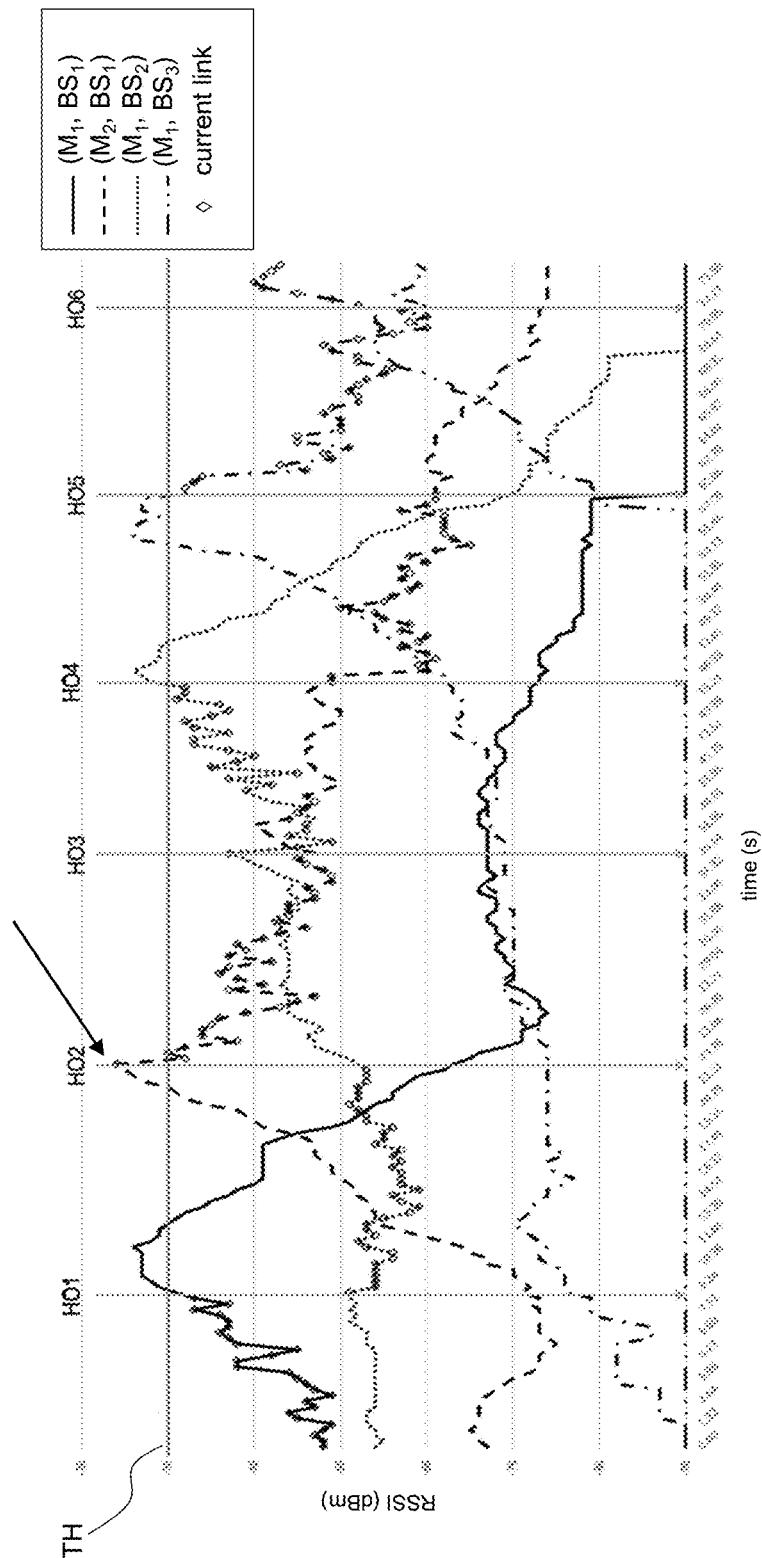
FIG. 8 illustrates an example graph reporting the downlink signal strength of neighbor base stations.

FIG. 8 is a graph reporting the downlink signal strength (RSSI) of neighbor base stations plotted as a function of time (seconds) as measured by an on-board mobile radio is station of the type shown in FIG. 4, which is mounted on a train moving in a subway tunnel. In the time interval shown in the graph, a sequence of handoffs HO1 to HO6 take place. In this example, the threshold RSSI value, TH, is a predetermined constant value indicated with a horizontal line.

The graph of FIG. 8 shows the RSSI signals received by the mobile station in a section of the rail track run by the moving train. In the section, neighbor base stations for the mobile radio station are $BS_1$, $BS_2$ and $BS_3$. Solid line represents the RSSI from $BS_1$, as received by the first RU $M_1$ from the front antenna at the head of the train (i.e. at time 0 the train is approaching the location of the mast of $BS_1$). The dashed line is the RSSI of the first base station $BS_1$, as measured by the second RU $M_2$ receiving the signal from the tail antenna at the end of the train (i.e. at time 0 the tail of the train is still relatively far from the mast of $BS_1$). The dotted line represents the RSSI received by the first RU $M_1$ from base station $BS_2$, which is positioned near adjacent to $BS_1$ in the travelling direction (timeline), is consecutive to $BS_1$ in the travelling direction. The dashed-dotted line represents the RSSI received by the first RU $M_1$ from base station $BS_3$, which is positioned near adjacent to $BS_2$ in the travelling direction. In the time interval shown in the graph, the RU $M_2$ detects no significant signal from $BS_2$ and $BS_3$, as these base stations are still distant, i.e. they are non-neighbor base stations.

FIG. 8 shows also the current link (diamond symbols) resulting from the application of a handoff algorithm based on base station banning at the location of the base station, according to an embodiment. When the signal strength of the current link exceeds a TH value, a handoff is performed at a handoff time $t_h$ from the current base station to a base station, different from the current base station, having the best signal strength.

In the example shown in FIG. 8, at an initial time, t=0, the pair $<M_1, BS_1>$ (solid line) is selected. The values of $RSSI_{11}$ stored in the table are continuously monitored and, when $RSSI_{11}$ becomes larger than TH, $BS_1$ is flagged as banned and a handoff HO1 at handoff time $t_{h1}$ is performed to a neighbor base station $BS_2$ (dotted line) having the second best signal strength of the RSSI values associated with the non-banned base stations, i.e. pair $<M_1, BS_2>$. In this example, the handoff time $t_{h1}$ sets a ban time duration $\Delta t_{ban}$ during which a wireless connection between the mobile RU $M_1$ and $BS_2$ is maintained. When $\Delta t_{ban}$ ends, the exclusion of $BS_1$ is removed and a wireless connection is established according to the pair having the highest signal strength.

Preferably, a condition exists according to which a base station cannot be consecutively banned more than once. This condition expresses the high likelihood that, when exiting the keyhole, the best signal is that of the last-banned BS because the mobile receiver is still positioned at the proximity of that BS, but outside the keyhole.

In preferred embodiments, the handoff algorithm executed by the processor of the mobile RU proceeds, upon ending the ban duration $\Delta t_{ban}$, by selecting the highest RSSI value not exceeding TH unless the base station having the highest value is the last-banned base station.

In practice, in these embodiments, a condition for banning a base station is:

if $RSSI_{xy}$>TH AND(ID-$BS_y$ not equal ID-$BS_{last-banned}$). (1)

In the example of FIG. 8, once the $\Delta t_{ban}$ has ended, at handoff time $t_{h2}$, a handoff HO2 is performed to the pair $<M_2, BS_1>$ although the RSSI value at the end of the ban time duration, is higher than the TH value (point indicated in the figure with an arrow).

In the example described with reference to FIG. 8, the threshold signal strength value TH is a predetermined single value. In another embodiment, a fixed threshold signal strength value is defined for each base station of the plurality of wayside base stations. The figure shows successive handoffs HO3 to HO6. It is worth noting that, while HO4, similarly to HO1, is a handoff triggered by the detection of a RSSI exceeding TH with consequent banning of the current base station, HO3, HO5 and HO6 are handoffs based only on the best signal strength because, during the direct connection between the mobile radio station and the base station as current base station, the RSSI values did not exceed TH.

Preferably, except for the handoff triggering by the detection of a RSSI exceeding is a threshold signal strength value, the handoff procedure is based on the best signal strength for the establishment of the radio communication link with a wayside base station.

In the example described with reference to FIG. 8, the ban time duration is a static parameter, which may be selected as a constant value, in particular the same value, for any handoff. A predetermined time duration K may be selected for any handoff and exclusion of the banned base station is removed when the predetermined time duration K has lapsed.

The signal strength transmitted from a base station may depend on several factors, mostly uncontrollable, and therefore fixed, pre-defined values for the RSSI threshold and/or for the ban time duration may not properly and/or efficiently work in a number of train-to-ground systems.

In addition, useful information for an automatic detection of a threshold signal strength value can be derived from the behavior of the signal strength curve over time, namely during travelling of the moving radio station along the fixed wayside base stations.

Figure 9:
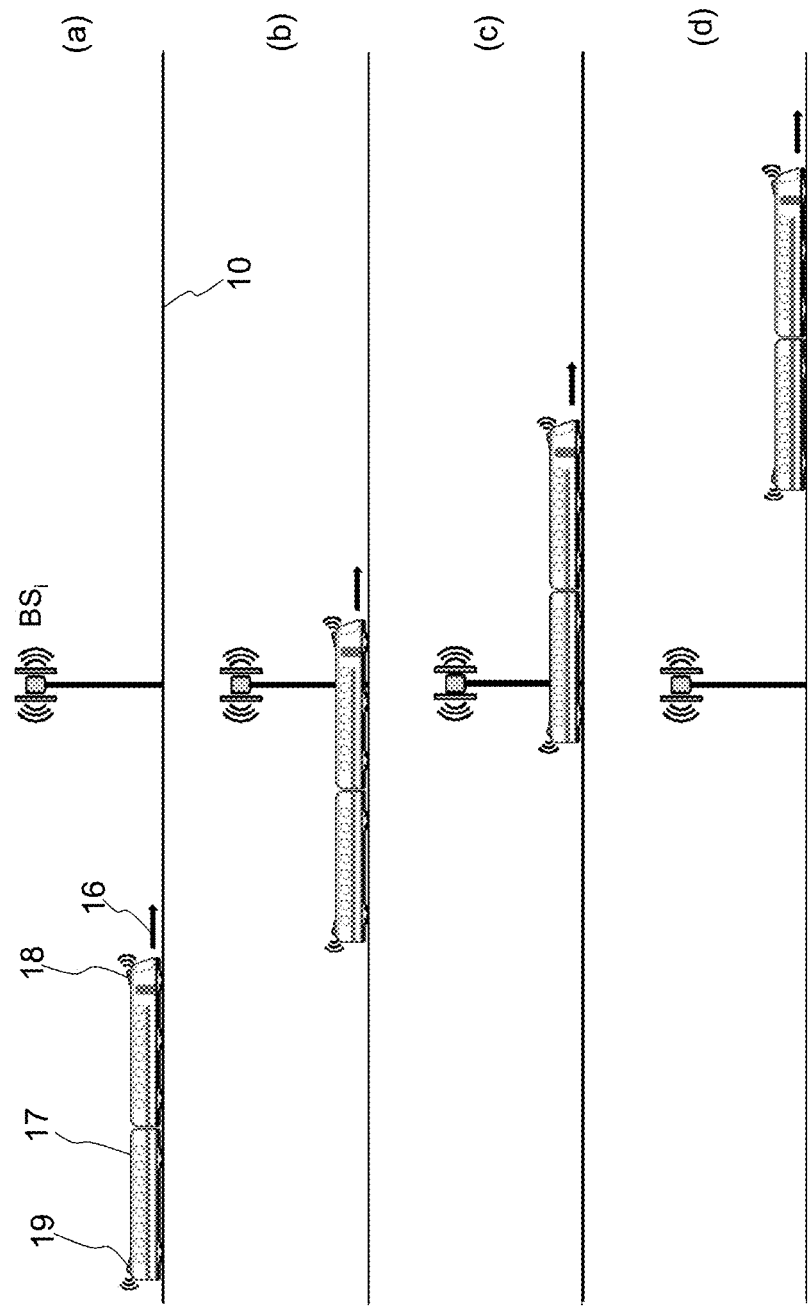
FIG. 9 illustrates an example diagram of the train-to-ground wireless connection in a tunnel approaching and leaving the position of a base station.

FIG. 9 is a diagram of the train-to-ground wireless connection in a tunnel at the vicinity of a base station indicated with $BS_i$ to pictorially and schematically represent the phases of a RSSI curve in proximity of a keyhole. Same numbers indicate the same or similar features shown in previous drawings. The behavior of the RSSI curve may be divided in four main phases (a) to (d):

In phase (a), the train 17 is moving towards base station $BS_i$. The RSSI values received by the moving antenna 18 at the head of the train steadily increase as the train approaches $BS_i$ reaching its maximum when the head of the train has reached the base station. In this phase the RSSI curve is "in-rise."

In phase (b), the RSSI values rapidly decrease as the head of the train passes the base station, i.e. the RSSI curve of values is "in-fall". During this phase, the mobile radio unit, in particular through the front RU, is largely unable to is communicate with $BS_i$ due to keyhole effect;

In phase (c), which may be defined an "out-rise" phase for the RSSI curve, the RSSI values received by the moving antenna 19 at the back of the train rapidly increase as the tail of the train reaches $BS_i$. During this phase, the radio communication between the mobile radio unit, in particular through the back RU, and the base station still suffers from the keyhole effect.

In phase (d), the train moves away from $BS_i$ and the RSSI values slowly decrease, i.e. the RSSI curve of values is "out-fall."

Figure 10:
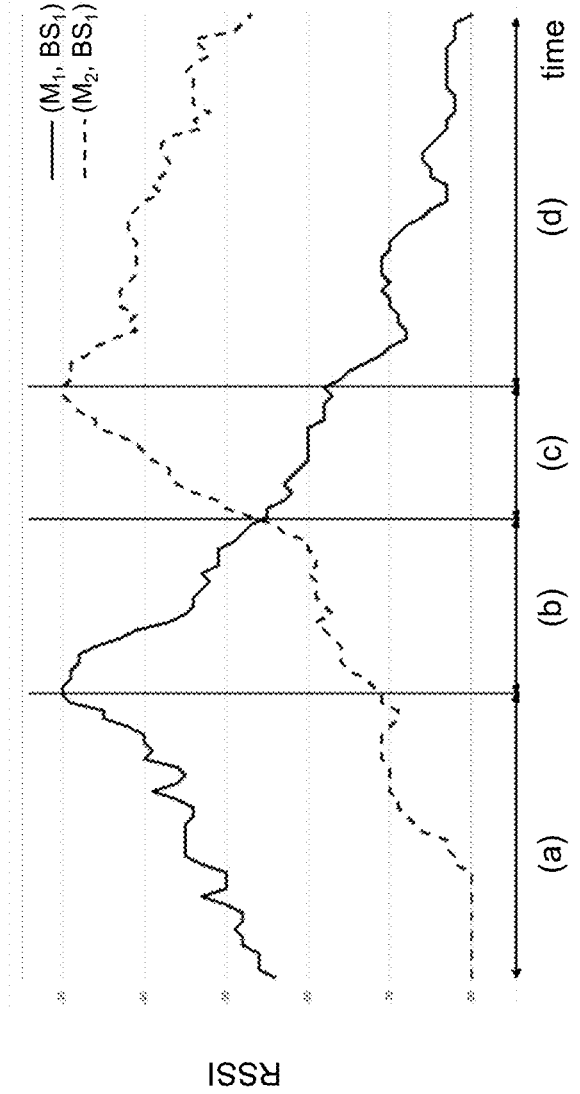
FIG. 10 illustrates an example plot of received signal strength indicator (RSSI) curves for a base station across a keyhole represented in FIG. 9.

FIG. 10 shows exemplary RSSI curves for the pair <$M_1$, $BS_1$> (solid line) and the pair <$M_2$, $BS_1$> (dashed line) with a pictorial indication of the four phases of the RSSI curve across a keyhole in the timeline. The two curves mirror one another on the time axis as the two directional antennas are mounted back-to-back, in particular with the main lobes pointing opposite directions with respect to the travelling direction. The behavior of the RSSI curve, in implementations that employ directional antennas, may be asymmetric between the in-fall portion of the curve—phase (b)—and the out-fall portion of the curve—phase (d), because when passing through the mast of the base station, the radio unit at the back of the train connects to the base station with the back lobe of its antenna.

The four phases of the RSSI curve behavior may be identified by the curve slope. According to the customary mathematical definition, the slope of a curve at a point is defined to be the slope of the tangent line at that point and provides an indication of the steepness of the curve as well as the information on whether, at a point of the curve, values are ascending or descending. A positive gradient, that is a positive value of the slope, represents an increasing curve (concave upward) moving from left to right in x-axis, in this case the time axis, while a negative gradient represents a decreasing curve (concave downward), always moving in the time axis.

Qualitative behavior of the RSSI curve is summarized in Table 3 below. When the train is approaching the base station in phase (a), the slope of the RSSI curve is positive; at the keyhole in phase (b), it is highly negative, for example it is less than −5 dBm/sec; when exiting the keyhole in phase (c), the slope is highly positive, namely a steep increase in the RSSI curve takes place; and as the train moves away from the baser station in phase (d), the slope is negative and the curve has a smoother pendency.

TABLE 3

| Phases of RSSI curve | RSSI slope | Packet Loss |
|---|---|---|
| (a) IN-RISE | >0 | Low |
| (b) IN-FALL | <<0 | High |
| (c) OUT-RISE | >>0 | High |
| (d) OUT-FALL | <0 | Low |

In various embodiments, the ingress point of a keyhole at a base station in communication with a mobile radio unit may be identified by determining the transition from the in-rise phase (a) to the in-fall phase (b), the transition corresponding to a sign change of the slope from positive to negative. Analogously, the keyhole egress point may be identified by determining the transition from the out-rise phase (c) to the out-fall case (d), namely the sign change of the slope from negative to positive.

An automatic estimate of a RSSI threshold value associated to each of the base stations, which is based on the dynamic detection of the ingress point of the keyhole, may improve accuracy in the handoff procedure as it allows to take into account the signal radiation diversity among the wayside base stations and/or possible fluctuations or instabilities of the signal strength emitted from the base stations.

The ingress point to the keyhole may be identified by the point at which the RSSI curve makes a transition from a positive slope to a negative slope. Mathematically, a transition from positive slope to negative slope may be represented by an inflexion point of the curve, where the second derivative of the curve is null.

As discussed above, at the entry of keyhole, the slope of the RSSI curve becomes highly negative. Alternatively to the determination of the inflexion point of the RSSI curve from positive to negative, the ingress point of the keyhole may be determined by is detecting when the negative slope values are larger than a threshold negative slope value, $S_{th}$, for example larger than −5 dBm/s.

In general, in the present description and claims, it is referred to a slope singularity when one of the above two conditions are met.

A threshold RSSI value, $TH_{xy}$, may be determined on the basis of the determination of the slope singularity of the RSSI curve, for increasing RSSI values, which is indicative of the ingress point of the keyhole for the pair <$M_x$, $BS_y$>.

Preferably, the keyhole ingress point is automatically determined each time the mobile RU $M_x$ travels within the coverage area of neighbor base station $BS_y$.

In embodiments, for each received hello packet, the processor is configured, further to storing the signal strength value $RSSI_{xy}$ associated with the radio unit identifier, ID-$M_x$, and the base station identifier, ID-$BS_y$, in the neighbor table as table entry, to enter that $RSSI_{xy}$ value as input data into an interpolation algorithm that iteratively calculates the slope of a curve fitting RSSI values. The interpolation algorithm may use a group of RSSI values including or consisting of the current value $RSSI_{xy}$ and a plurality of RSSI values previously stored, for example the last 2 to 6 RSSI values received as table entries, to calculate an average slope value of a curve fitting those RSSI values. Each time a new current RSSI value is entered in the interpolation algorithm, a new average slope value is determined. As customarily, the interpolation algorithm may run on the processor of the mobile radio unit, such as the master processor in case of more than one radio unit. The fitting curve is updated any time a RSSI value is entered in the table and thus it is also received as data point for the curve.

In particular, the interpolation algorithm, upon receiving a RSSI value, calculates a curve fitting the group of RSSI values close to and including the last received RSSI value.

The fitting curve may take on any mathematical description and may utilize any number of techniques known in the art to provide a best fit curve for the data points. The algorithm may be of known type and use data filtering, weighing or predictive models in is computing the instantaneous value of the slope of the RSSI curve. In an embodiment, the algorithm is a Holt-Winters forecasting algorithm that places exponentially decreasing weights to the older data.

The processor causes an iterative calculation, from a RSSI curve fitting the instantaneous current $RSSI_{xy}$ values, of the instantaneous slope values, $S_{xy}$, associated with base station $BS_y$ as received by mobile RU $M_x$. In particular, the processor causes an iterative analysis of the calculated slope values to determine a slope singularity, namely if a slope value from a positive value reaches a zero value (or very close to zero) or is smaller than a (negative) threshold slope value, $S_{th}$.

The calculated curve slope values are stored in the neighbor table to allow the analysis of the values. Preferably, the curve slope values are entered, in real time, when a RSSI value is entered, into a dedicated column of the neighbor table and they are associated with the respective RSSI values.

Iterative determination of the slope values the curve that fits the RSSI values is performed at least after having determined that the current base station is a banned base station and at least of the banned base station. In preferred embodiments, the instantaneous slope value is determined and stored for any neighbor base station. The neighbor table is continuously updated by means of an update procedure run by the processor.

In an embodiment, if a slope is determined to be null (positive-negative curve inflexion) or smaller than a $S_{th}$, the processor causes the determination of a new $TH_{xy}$ value from the RSSI value in the fitting curve associated with a time of the occurrence of the slope singularity, the time defining the ingress point of the keyhole in the time axis.

Preferably, once a threshold RSSI value $TH_{xy}$ for a base station is determined, it is stored in a table, indicated as threshold table, to be used as a threshold value for that base station for the subsequent times the mobile radio station is in the proximity of that base station. Preferably, the RSSI threshold value for each neighbor base station is stored in the threshold table.

The threshold table may be stored in a memory space operatively coupled with the processor or part of the processor.

Preferably, the threshold values entered in the threshold table do not expire so that they can be used as reference values that set the start of the ban the next time the mobile radio station travels along the wayside base stations. In the subsequent time the mobile radio unit is in the proximity of a wayside base station, a new threshold value is calculated from the detection of the ingress point and stored in the table. In this way, threshold RSSI values, which define the start of the ban, are updated at each ride of the vehicle and used in the subsequent ride.

Although it is possible to store the updated $TH_{xy}$ values in the neighbor table, use of a separate table is preferred when the handoff procedure includes the removal of rows from the neighbor table if measured values of the RSSI of that row have not been updated for a given time.

Table 4 below is a conceptual example of a threshold table, in which each row includes the mobile RU identifier, the base station identifier and the threshold value determined for each base station and mobile R, that is $TH_{xy}$, associated with the pair $<M_x, BS_y>$ and determined from the analysis of the RSSI curve.

TABLE 4

| Mobile RU | BS ID | TH |
| --- | --- | --- |
| ID-$M_1$ | ID-$BS_1$ | $TH_{11}$ |
| ID-$M_2$ | ID-$BS_1$ | $TH_{21}$ |
| ID-$M_1$ | ID-$BS_2$ | $TH_{12}$ |
| ID-$M_2$ | ID-$BS_2$ | $TH_{22}$ |
| ID-$M_1$ | ID-$BS_3$ | $TH_{13}$ |
| ID-$M_2$ | ID-$BS_3$ | $TH_{23}$ |

After storing the threshold value $TH_{xy}$ in the threshold table, the subsequent time the mobile radio station is in the coverage area of base station $BS_y$, the processor is configured to repeatedly query the neighbor table to compare the RSSI value, namely the measured $RSSI_{xy}$ values of the pair $<M_x, BS_y>$, with the threshold value $TH_{xy}$ stored in the threshold table.

In another embodiment, a threshold value $TH_{xy}$ is calculated from a maximum RSSI value, $MRSSI_{xy}$, detected at or near the slope singularity. In this embodiment, the processor is configured to determine a maximum RSSI value, $MRSSI_{xy}$, within a range of RSSI values measured at and near the slope singularity. In particular, the RSSI values of the range is associated with the slope values comprising the value associated with the is slope singularity. In an embodiment, the $MRSSI_{xy}$ is selected as the maximum RSSI value of the last M measured RSSI values preceding and including the slope singularity, where M may be a number from 10 to 20. This range of RSSI values is indicated in the following also as singularity neighborhood.

The $MRSSI_{xy}$ value is stored as an entry in a separated column of the neighbor table, The $MRSSI_{xy}$ value is updated when, at a subsequent ride of the train, a RSSI value larger than the stored $MRSSI_{xy}$ is detected. To this end, the processor may be configured to check if a RSSI value entered in the table as measured RSSI value is larger than the stored $MRSSI_{xy}$ value and, in the positive, to replace the $MRSSI_{xy}$ value previously stored with the new value.

Preferably, determining a $TH_{xy}$ value comprises using the $MRSSI_{xy}$ value associated with a slope value within the neighborhood of the slope singularity, in practice the last stored $MRSSI_{xy}$ value. In particular, a threshold value is calculated by subtracting a constant number, C, to the MRSSI value associated with the slope singularity:

$$TH_{xy} = (MRSSI_{xy})_{SS} - C \quad (2)$$

The reduction of the $(MRSSI_{xy})_{SS}$ value by a constant value is often preferred to take into account possible errors in values determined by the algorithm. The constant number C is expressed in the units of the MRSSI value and can be, for example, 2 dBm.

The use of a $(MRSSI_{xy})_{SS}$ value for the determination of the threshold RSSI value may be preferred to take into account delays in the computation of the slope singularity.

The $TH_{xy}$ value is stored in the threshold table and, preferably, the $MRSSI_{xy}$ value associated with the base station, in case it is calculated by means of Eq. (2), in the neighbor table are reset for the subsequent run across the base station.

Table 5 below is a conceptual example of neighbor table as a dynamic read table. With respect to Table 2, each table row includes also the maximum RSSI value recorded by the mobile RU, MRSSI, and the slope values calculated from the RSSI curve every time a new RSSI value is entered.

TABLE 5

| Mobile RU | Base station | RSSI values | MRSSI | Curve slope | Ban flag |
| --- | --- | --- | --- | --- | --- |
| ID-$M_1$ | ID-$BS_1$ | $RSSI_{11}$ | $MRSSI_{11}$ | $S_{11}$ | |
| ID-$M_2$ | ID-$BS_1$ | $RSSI_{21}$ | $MRSSI_{21}$ | $S_{21}$ | |
| ID-$M_1$ | ID-$BS_2$ | $RSSI_{12}$ | $MRSSI_{12}$ | $S_{12}$ | |
| ID-$M_2$ | ID-$BS_2$ | $RSSI_{22}$ | $MRSSI_{22}$ | $S_{22}$ | |
| ID-$M_1$ | ID-$BS_3$ | $RSSI_{13}$ | $MRSSI_{13}$ | $S_{13}$ | |
| ID-$M_2$ | ID-$BS_3$ | $RSSI_{23}$ | $MRSSI_{23}$ | $S_{23}$ | |

As described above, the duration of residence of a mobile radio unit in a keyhole may be described by a parameter, such as a predetermined time interval, which is selected so that, at the lapse of that time interval, there is a high likelihood that the mobile RU travels outside of the keyhole.

For a specific wayside base station, residence time in a keyhole mainly depends on the speed of the vehicle. For example, keyhole residence time may last from 5 to 13 seconds for a train traveling at speeds from 80 to 30 km/h. It may be advantageous to automatically detect the termination of the ban and thus the ban time duration to improve accuracy of the handoff procedure.

As previously observed with reference to FIG. 5, at the keyhole, the data throughput exhibits a very deep and wide fall to increase again after having passed the coverage hole. The data throughput may be represented by the packet loss of packets traveling through the network without reaching their destination. The packet loss may be is measured from the packet loss rate, which may be represented by a percentage or a ratio value of packets lost with respect to packets sent by a radio unit within a given time interval. The entry into a keyhole is generally associated with a high packet loss (e.g. packet loss rate greater than 80%), in correspondence of the falling edge of the RSSI curve, i.e. when the curve becomes strongly negative.

Preferably, the mobile radio station, in particular the transceiver of the one or more radio units, periodically transmits probe packets to each base station of the neighbor base stations with which in radio communication. Probe packets are unicast data packets carrying a timestamp transmitted to a unique destination, e.g. a specific base station, periodically, for example every 500 milliseconds or every second.

The neighbor base stations announce themselves to the mobile RU by broadcasting hello packets that contain the base station identifier. The mobile RU is thus made aware of their existence and may initiate the periodic transmission of the probe packets to the neighbor base stations. Upon receipt of a probe packet, the receiver of the probe packet, i.e. a base station, transmits an acknowledgement, such as an acknowledgment message, to the mobile radio RU. If no acknowledgment message is received by the mobile RU within a predetermined time interval from the transmission of the probe packet, the probe packet is considered lost.

In some embodiments, measurement of the packet loss at a base station can be used for a dynamic detection of the egress point of the keyhole and thus of the ban time duration.

Preferably, the packet loss in the communication between the mobile RU and the is banned base station is monitored to automatically and in real time detect the egress point of the keyhole and thus to determine the ban time duration $\Delta t_{ban}$. In particular, when the egress time point of the keyhole is determined, the ban time duration is defined by the time interval $\Delta t_{ban}$ between the handoff time $t_h$ of the mobile radio station from the banned current base station to the destination base station and the egress time point calculated on the basis of the packet loss of the banned base station.

Residence in the keyhole may be represented by packet loss rate higher or equal than a threshold packet loss rate and exit from the keyhole at the egress point may be represented by a packet loss rate smaller than the threshold loss rate. For example, the threshold loss rate may be of from 15% to 25%, e.g. 20%.

Packet loss may be monitored only during the ban of a base station and/or only for the communication between the banned base station and the mobile RU (in the example of Table 6, $BS_3$). In an embodiment, pack loss monitoring initiates at the banning of the current base station.

In another embodiment, packet loss may be continuously monitored for the current base station and possibly for each neighbor station present in the neighbor table.

Preferably, the processor of the radio station is configured to: cause a periodic transmission of probe packets to the current base station; receive acknowledgments of said transmitted probe packets (from the current base station); at least after the handoff time, $t_h$, the current base station being a banned bass station, calculate a packet loss rate based on the acknowledgments received from the banned base station with respect to the sent probe packets within a predetermined time window; determine if the calculated packet loss rate is smaller than a threshold loss rate, and, in the positive, establishing that the $\Delta t_{ban}$ has ended.

The predetermined time widow may be selected to be smaller than the expected residence time in a keyhole. For example, the predetermined time window is of from 0.25 to 1 second.

Packet loss rate is determined at least after the handoff time $t_h$ to determine the is end of the ban for the current base station. In preferred embodiments, the packet loss rate is determined for each neighbor base station present in the neighbor table, independently of whether the neighbor base station is a banned base station.

Preferably, determination of the packet loss rate is executed by an algorithm running in the processor separately from the algorithm executing the determination of the slope of the RSSI curve.

Table 6 below is a conceptual example of neighbor table as a dynamic read table. With respect to Table 5, each table row further includes the packet loss rates $PL_{xy}$. Preferably, the columns of packet loss and curve slope are continuously updated independently from one another.

TABLE 6

| Mobile RU | Base station | RSSI values | $(RSSI)_{max}$ | Curve slope | Packet loss | Ban flag |
|---|---|---|---|---|---|---|
| ID-M$_1$ | ID-BS$_1$ | RSSI$_{11}$ | MRSSI$_{11}$ | S$_{11}$ | PL$_{11}$ | |
| ID-M$_2$ | ID-BS$_1$ | RSSI$_{21}$ | MRSSI$_{21}$ | S$_{21}$ | PL$_{21}$ | |
| ID-M$_1$ | ID-BS$_2$ | RSSI$_{12}$ | MRSSI$_{12}$ | S$_{12}$ | PL$_{12}$ | |
| ID-M$_2$ | ID-BS$_2$ | RSSI$_{22}$ | MRSSI$_{22}$ | S$_{22}$ | PL$_{22}$ | |
| ID-M$_1$ | ID-BS$_3$ | RSSI$_{13}$ | MRSSI$_{13}$ | S$_{13}$ | PL$_{13}$ | x |
| ID-M$_2$ | ID-BS$_3$ | RSSI$_{23}$ | MRSSI$_{23}$ | S$_{23}$ | PL$_{23}$ | x |

Figure 11:
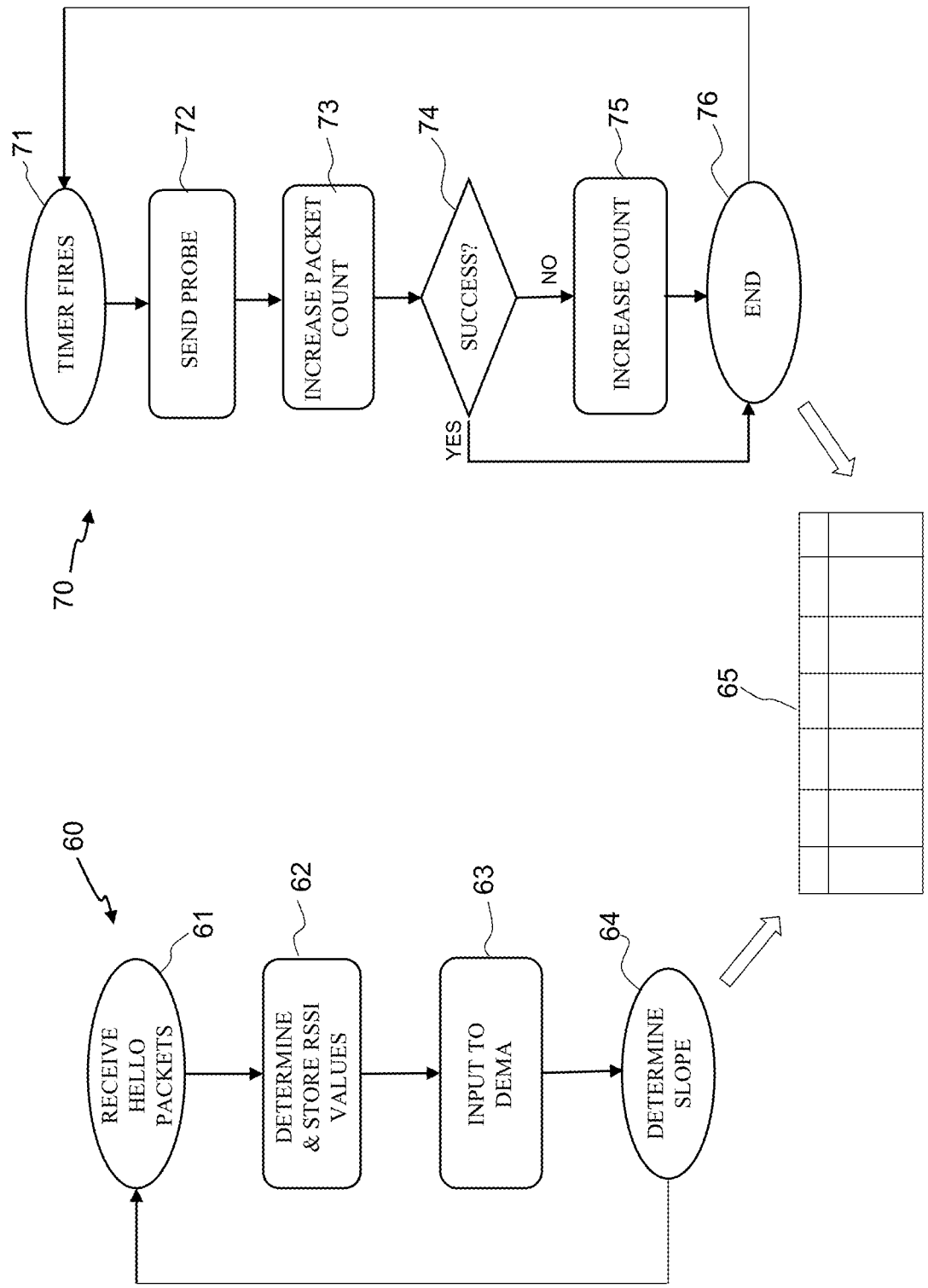
FIG. 11 illustrates an example flow chart for the automatic detection of the ingress point of the keyhole.

FIG. 11 shows flow charts for the automatic detection of the ingress point and of the egress point of a keyhole including monitoring of the packet loss for a continuous update of the slope values and the packet loss rates in the neighbor table, according to an embodiment.

Flow chart 60 describes the iterative procedure for the calculation of the slope of the RSSI curve for base station BS$_x$. In a first step, hello packets are received at the mobile RU, e.g. M$_1$, from base station BS$_x$ (block 61). From the received hello packets, the RSSI$_{1x}$ values are determined and stored in neighbor table 65 (block 62). Neighbor table 65 can be of the type of Table 6. The stored RSSI$_{1x}$ values are continuously fed into a DEMA algorithm, for calculation of a slope value of the curve fitting the fed values (block 63). When the DEMA filter determines a slope value, that value is entered in neighbor table 65 and the procedure ends (block 64) to start again at block 60.

Flow chart 70 describes an iterative procedure for packet loss evaluation in a is transmission link between mobile RU M$_1$ and base station BS$_x$. The mobile RU M$_1$ is equipped with a timer setting the time for transmission of probe packets and the time intervals between consecutive probe packets (firing period). When the timer fires (block 71), $M_1$ sends a probe packet to base station $BS_x$ (block 72). Any fired probe packet increases a transmission packet count (block 73) representing the number of consecutive probe packets transmitted to base station $BS_x$. Within a predetermined time window set by the timer, for example 2 seconds, the processor determines whether the transmission of a probe packet has been successful or unsuccessful (block 74). Any unsuccessful transmission increases an error packet count (block 75), representing the number of unreceived probe packets. In particular, if the probe packet transmission has been successful, namely $M_1$ receives an acknowledgment, the procedure ends (block 76). If no acknowledgment is received within the predetermined time window, the error packet count for base station $BS_x$ increases (block 74). On the basis of the transmission packet count and the error packet count, the values of packet loss rate are calculated and entered in table 65. When the firing period expires, the timer fires again and steps 72 to 75 are repeated, in particular the packet loss rates for base station $BS_x$ are repeatedly calculated. If $BS_x$ is the current base station, $BS_c$, flagged as a banned base station, the processor analyses if the packet loss rate is below a threshold loss rate and, in the positive, determine that the ban time duration $\Delta t_{ban}$ has ended and the ban flag can be removed.

According to an embodiment, the egress point of the keyhole is determined from the automatic detection of a slope singularity. In this embodiment, the egress point time is identified by determining the transition from the out-rise phase (c) to the out-fall case is (d) described with reference to FIG. 9, namely the sign change of the slope from highly positive to negative. In particular, the ban time duration may be defined as the time interval between the handoff time $t_h$ and the egress point time, wherein the egress point time is the time at which the fitting curve exhibits a slope singularity, such as an inflexion point from positive to negative slope.

Although the invention has been described with respect to a limited number of embodiments, it will be appreciated that many variations and modifications may be made, and are intended to be within the scope of the appended claims.

The techniques described herein, therefore, provide for a method for managing radio communication and in particular for handing off wireless radio communication between a plurality of fixed wayside radio base stations arranged spatially separated along a pathway and a mobile radio station moving in a travelling direction along the pathway.

At each instant, a radio unit of the mobile radio station may be in radio communication with a number of wayside base stations, in the present description and claims referred to as neighbor base stations. Non-neighbor base stations are those base stations of the plurality of wayside base stations, which, at the instant or time frame considered, either do not transmit or transmit signals that are low enough to be considered noise. The plurality of neighbor base stations may be (and typically is) a sub-plurality of the plurality of wayside base stations, typically a small number, for example from 2 to 4.

In particular, a method is described for managing a radio communication link between a mobile radio station and a plurality of fixed wayside base stations arranged spatially separated along a pathway, wherein the mobile radio station moves in a travelling direction along the pathway with respect to the wayside base stations. In various embodiments, the method comprises: a) receiving, at a mobile receiver of the mobile radio station in radio communication link with a current base station of the plurality of base stations, hello packets from one or more neighbor base stations, the one is or more neighbor base stations being comprised in the plurality of wayside base stations and including the current base station, wherein each hello packet includes a base station identifier univocally identifying the neighbor base station transmitting the hello packet; b) determining respective signal strength values for the received hello packets and store the determined signal strength values in association with the respective base station identifiers; c) periodically analyzing the stored signal strength values associated with the current base station to determine whether the signal strength values are larger than a threshold signal strength value associated with the current base station; d) if a signal strength value associated with the current base station is determined to be larger than the threshold signal strength value, determining that the current base station is a banned base station and proceed with analyzing the stored signal strength values associated with the remaining neighbor base stations, other than the banned base station, to select a neighbor base station associated with the highest signal strength value as destination base station, and forcing a handoff of the mobile radio station from the banned current base station to the destination base station, thereby establishing a new radio communication link between the mobile radio station and the destination base station at a handoff time.

Preferably, the method further comprises, upon periodically analyzing the stored signal strength values, e) if the signal strength value associated with the current base station is smaller than or equal to the threshold signal strength value, proceed with: analyzing the stored signal strength values associated with any of the neighbor base stations (including the current base station) to select a neighbor base station associated with the highest signal strength value, if the highest signal strength value is associated with the current base station, maintain the mobile receiver in radio communication link with the current base station, and if the highest signal strength value is associated with a second neighbor base station other than the current base station, forcing a handoff of the mobile radio station from the current base station to the second neighbor base station, thereby establishing a new radio communication link between the mobile radio station and the second neighbor base station.

With "banning" a base station it is meant prohibiting the mobile radio station, and is in particular the one or more mobile radio units of the mobile radio station, from connecting that base station so that a direct radio communication link with the excluded base station is not an option.

Preferably, the method further comprises starting a ban time duration at the handoff time, and, when the ban time duration ends, removing the exclusion of the banned base station. Accordingly, the base station associated with the above-threshold signal strength value is excluded from the handoff candidates for radio connection with the mobile radio station for the time duration of the ban.

In many practical situations, the destination base station selected at the time of banning of the current base station has a signal strength value not exceeding its threshold signal strength value. In particular, the signal strength value associated with the destination base station may be in many instances (significantly) smaller than the signal strength value of the current base station at the time of the banning.

Upon handoff from the banned base station, the destination base station becomes the current base station for the mobile radio station.

Preferably, at a certain instant of time, a single radio communication link is established between a radio receiver of the mobile radio station and one wayside base station of the neighbor base stations, indicated as current base station.

Often, yet not necessarily, the destination neighbor base station may be a near adjacent (preceding or consecutive) base station of the banned base station in the plurality of wayside base stations arranged along the pathway.

Preferably, periodically analyzing the stored signal strength values associated with the current base station comprises periodically analyzing the stored signal values associated with the one or more neighbor base stations.

Preferably, the determined signal strength values are stored in a non-transitory memory comprised in the mobile radio station. The term "memory" as used throughout herein means all forms of computer memory, which may be accessed. In particular, the memory may be accessed by one or more electronic processors of the mobile radio station. The term "memory" may refer to a single or multiple memory spaces having storage capacity, for example operatively coupled to or being comprised in the one or more radio units of the mobile radio station.

Preferably, the threshold signal strength value associated with the current base station is stored in a non-transitory memory. Preferably, threshold signal strength values associated with respective base stations of the plurality of wayside base stations are stored in a non-transitory memory.

The present disclosure may be implemented according to one or more of the following embodiments, optionally combined together.

Determining that the current base station is a banned base station may comprise excluding any stored signal strength value associated with that banned base station. Analyzing the stored signal strength values associated with the remaining neighbor base stations may comprise ignoring the signal strength values associated with the banned base station.

Storing the determined signal strength values in association with respective base station identifiers may comprise storing the signal strength values and the associated base station identifiers in a neighbor table as table entries.

The table may be a dynamic read table automatically updated when a new hello data packet is received by the mobile receiver.

Excluding any stored signal strength value associated with the banned base station may comprise storing an indication of the presence of a ban in association with the signal strength values of the banned base station, the indication indicating whether the base station is excluded or included in the query for a handoff candidate base station. The indication may be the addition of a table entry, such as flag ("ban flag"), associated with the signal strength values of the banned base station. The ban flag may be added in any table row that includes the base station identifier of the banned base station. The indication, such as the ban flag, temporarily blocks future association of a mobile receiver of the mobile radio station with the banned base station for the ban time is duration.

Removal of the exclusion of the banned base station implies that that base station is again a handoff candidate in the neighbor base stations. In particular, at the end of the ban duration, the stored signal strength values associated with the last-banned base station are analyzed together with the stored signal strength values associated with all the non-banned base stations to determine the highest signal strength value.

Preferably, after the handoff of the mobile radio station from the banned base station to the destination base station, during the ban time duration, the method comprises: i) analyzing the stored signal strength values associated with neighbor base stations other than the banned base station and including the destination base station to determine the highest signal strength value in the stored signal strength values; ii) if the determined highest signal strength value is associated with a neighbor base station other than the destination base station (the banned base station being excluded from the candidate base stations), forcing a handoff of the mobile radio station from the destination base station to that neighbor base station as the new current base station.

In an embodiment, the present disclosure may envisage that the radio communication link between the mobile radio station and the destination base station is maintained during the whole ban time duration. In this case, at the end of the ban, the destination base station is the base station currently in radio communication link with the mobile radio station.

Since, at the end of the ban time, the mobile receiver is expected to have exited the keyhole of the base station previously excluded, a signal strength value above threshold for the same base station does not entail keyhole phenomena.

Removal of the exclusion of the banned base station may comprise setting that this base station is a last-banned base station.

Preferably, the method comprises, upon removal of the exclusion of the banned base station at the end of the ban time duration, analyzing the stored signal strength values associated with the neighbor base stations including the last-banned base station to determine the highest signal strength value; if the highest signal strength value is associated with the last-banned base station, forcing a handoff of the mobile radio station from the destination base station to the last-banned base station as the new current base station, and if the determined highest signal strength value is associated with a neighbor base station other than the last-banned base station and other than the destination base station, forcing a handoff of the mobile radio station from the destination base station to that neighbor base station as the new current base station.

Preferably, after the handoff from the destination base station, the method comprises iteratively executing operations c) and d) and preferably e) above, the current base station being the new current base station.

At an initial time, such as at the initialization of a handoff algorithm according to the present disclosure, a neighbor base station having the highest signal strength value may be selected. This may imply that, at the initial time, the vehicle may be travelling or positioned at a keyhole. Then, the algorithm may execute operations from a) to d) and possibly e) as outlined above.

Preferably, at the end of the ban time duration, the method comprises iteratively executing operations c) and d) and more preferably c), d) and e) above for the current base station in radio communication link at the end of the ban.

Each of the base stations may define a radio coverage area of radio communication such as the coverage area of near adjacent, e.g. consecutive when viewed in the travelling direction, base stations partially overlap one another along the pathway, resulting in a coverage redundancy. The distance between base stations may be constant or variable in the base station deployment along the pathway.

The pathway may be a line or a curved track.

Preferably, the mobile radio station is arranged in, in particular mounted on, a vehicle moving in the travelling direction along the pathway.

The hello packets may be transmitted via radio frequency (RF) communication link.

Each base station is preferably configured to periodically transmit hello packets including a unique identifier associated to the base station. The periodical transmission of hello packets may take place in a frame of unsolicited data packet broadcast, according to known standards in wireless communication, for example in Wi-Fi standards IEEE 802.11.

In the present description and claims, the expression "hello packet" is meant to indicate a basic unit of radio communication that travels over the wireless network and contains information related to identification of the base station and possibly other parameters such as information on network status. Hello packets periodically emitted from a wayside base station may be beacon frames, although this is a non-limitative implementation. Typically, a beacon frame includes a header, a payload and a frame check sequence. The unique identifier for the base station is often included in the header while the payload contains time and capability information. Wireless examples of hello packets can be also those used by the mesh network Roofnet developed by Massachusetts Institute of Technology (M.I.T.).

Preferably, hello packets are broadcast packets used by protocols to advertise the presence a protocol-aware node in the network.

Preferably, the wireless communication network is a digital communication network.

The ban time duration may be a predetermined time duration. In those embodiments, preferably, the handoff time sets a predetermined ban time duration. At the lapse of the predetermined ban time duration, exclusion of the banned base station is removed.

The signal strength transmitted from a base station may depend on several factors, mostly uncontrollable, which may include the installation of the mast carrying the base station, the positioning of the wayside RF antennas with respect to the travelling direction, and manufacturing tolerances of RF cables and connectors in the base station. Therefore, a fixed, pre-defined value for the ban time duration may not properly and/or is efficiently work in a number of train-to-ground systems. In addition, or alternatively, a same value for the signal strength threshold for any wayside base station and/or a fixed signal strength threshold value associated with a base station may not take into consideration possible differences between base stations and/or between subsequent passages of the train across the same base station.

In embodiments according to the present disclosure, the threshold signal strength value to initiate the ban of a wayside base station is automatically detected so that it can be used as reference value the subsequent time the mobile radio station passes across that base station. Preferably, the automatic determination of the threshold signal strength value is based on a dynamic detection of the ingress point of the keyhole.

Preferably, the threshold signal strength value of a wayside base station is determined at each ride of the vehicle passing the base station so that it can be used as reference value that sets the start of the ban the next time the mobile radio station travels along that base station.

Preferably, the method comprises storing a threshold signal strength value in association with the current base station. More preferably, the method comprises storing threshold signal strength values in association with respective base stations of the plurality of wayside base stations, preferably before operation c).

The method may comprise, upon determining that the current base station is a banned base station: repeatedly calculating a slope value versus time of a curve fitting signal strength values stored in association with the current base station, the signal strength values including the last stored signal strength value; at least after determining that the current base station is a banned base station, determining in the calculated slope values a slope singularity in the fitting curve; associating to the slope singularity an ingress point time of high-loss transmission at the banned base station; and determining a new threshold signal strength value on the basis of the ingress point time and storing the new threshold signal strength value in association with the banned base station to replace a previously stored threshold signal strength value.

The signal strength values on which the slope is calculated may comprise a group of signal strength values including the last stored signal strength value and a plurality of signal strength values stored previously to the last stored value.

The slope singularity may be selected as the inflexion point of the fitting curve, at which a transition from a positive slope to a negative slope takes place.

The slope singularity may be selected as a negative slope value larger than a threshold negative slope value.

The new threshold signal strength value may be the signal strength value on the fitting curve which corresponds to the ingress point time.

Preferably, determining the new threshold signal strength value on the basis of the ingress point time comprises: determining, for the banned base station, a maximum signal strength value of a range of signal strength values measured at and near the slope singularity; storing the determined maximum signal strength value, and determining the new threshold signal strength value on the basis of the maximum signal strength value.

Preferably, the new threshold signal strength value is calculated by subtracting a constant number from the maximum signal strength value.

By using an updated threshold signal strength value based on an automatic estimate of the value associated to each of the base stations may improve accuracy in the handoff procedure as it allows to take into account the signal radiation diversity among the wayside base stations and/or possible fluctuations or instabilities of the signal strength emitted from the base stations.

Preferably, the ban duration and thus the termination of the ban is automatically detected.

As the occurrence of a keyhole phenomenon is characterized by a fall of data throughput in the communication link between a base station and the mobile radio station, entry and/or residence in a keyhole may be detected by determining the packet loss of packets traveling through the network without reaching their destination. In other words, the packet loss represents the amount of transmission errors with respect to a "normal" data traffic. The packet loss may be measured as a percentage or ratio value of packets lost with respect to packets sent by a transmission unit within a given time window, generally indicated as packet loss rate. Tracking packets generally involves transmission of packets having an acknowledgment mechanism: a packet transmitted by a transmission unit is lost if it is not acknowledged at the destination. The following description will make reference to probe packet, however, any packet with an acknowledgment mechanism may be used for the determination of the packet loss. In this respect, it is noted that, if hello packets are broadcast packets without a specific destination and thus without an acknowledgement mechanism, they are not suitable for providing an estimate of the packet loss.

Advantageously, monitoring of the packet loss rate allows to automatically and in real time detect the egress point of the keyhole and thus to determine the ban time duration from the handoff time at which the handoff is forced from the banned current base station to a destination base station.

The mobile radio station may comprise a radio unit comprising the mobile receiver and a mobile transmitter, and the method may further comprise: periodically transmitting, by the mobile transmitter, probe packets having as destination the current base station; receiving, at the mobile receiver, acknowledgments of the transmitted probe packets, an acknowledgment being indicative that a transmitted probe packet has reached the current base station; at least after determining that the current base station is a banned base station, repeatedly calculating a packet loss rate associated with the current banned base station, the packet loss rate being based on the received acknowledgments compared to the transmitted probe packets; determining if the calculated packet loss rate is smaller than a threshold loss rate, and if the calculated packet loss rate is smaller than the threshold loss rate, establishing that the ban time duration has ended.

Preferably, the packet loss rate is calculated across a predetermined time window.

According to the present disclosure, a mobile radio station is described, the mobile radio station comprising: at least one radio unit configured to receive hello is packets from one or more neighbor base stations of a plurality of wayside base stations arranged spatially separated along a pathway, each base station being configured to periodically transmit hello packets, each hello packet including a respective base station identifier, and an electronic processor operatively connected to the at least one radio unit and configured to receive hello packets from the at least one radio unit, process the received hello packets to determine respective signal strength values for the received hello packets and store the determined signal strength values in association with respective base station identifiers; periodically analyze the stored signal strength values associated with the current base station to determine whether the signal strength values are larger than a threshold signal strength value associated with the current base station; if a signal strength value associated with the current base station is determined to be larger than the threshold signal strength value, determining that the current base station is a banned base station and proceed with: analyzing the stored signal strength values associated with the remaining neighbor base stations, other than the banned current base station, to select a neighbor base station associated with the highest signal strength value as destination base station; forcing a handoff of the mobile radio station from the banned current base station to the destination base station, thereby establishing a new radio communication link between the mobile radio station and the destination base station at a handoff time.

Preferably, the electronic processor is configured to, at the handoff time, start a ban time duration, and, when the ban time duration ends, remove the exclusion of the banned base station.

Preferably, the mobile radio station is arranged on a vehicle moving in a travelling direction along the pathway.

The mobile radio station may be operatively connected to an on-board communication network system, such as a wireless communication system, for signal distribution and/or access.

The electronic processor may be configured to store signal strength values in a memory.

The electronic processor may be configured to store threshold signal strength values in a memory.

Preferably, the mobile radio station comprises a first mobile radio unit and a second radio unit arranged at a distance from one another along a length of the vehicle in the traveling direction. The first mobile radio unit may be mounted on a front part of the moving vehicle while the second mobile radio unit may be mounted on a back part of the moving vehicle. The first and second radio units may be connected to an on-board communication network system, preferably through a communication interface, such as an Ethernet network switch.

Preferably, the electronic processor is operatively connected to the first radio unit and is selected as a master processor configured to store the signal strength values in association with respective base station identifiers and mobile radio unit identifiers and to execute the iterative analysis of the stored signal strength values to manage the handoff from a current base station.

Preferably, the mobile radio station comprises a second electronic processor operatively connected to the second radio unit, wherein the second processor is selected as a slave processor, the slave processor being configured to: receive hello packets emitted by the neighbor base stations from the mobile receiver of the second radio unit and process the hello packets to determine respective signal strength values for the received hello packets and transmitting the determined signal strength values in association with a respective base station identifiers and mobile radio unit identifiers to the master processor, wherein the master processor is configured to store the signal strength values received from the slave processor and the signals strength values associated with the first radio unit in a neighbor table operatively coupled with or part of the master processor.

Preferably, the base stations of the plurality of wayside base stations use a same frequency channel for the radio communication with the mobile radio station. For example, the radio frequency channel is comprised within the 5 GHz band or the 2.4 GHz is band.

Although omni-directional antennas are not excluded from the scope of the present invention, currently available directive antennas are in most cases preferred as they typically exhibit higher gain, hence they can be used to reduce the density of the base stations along the track with advantages in terms of deployment costs.

Preferably, each radio unit comprises an antenna operatively coupled to transmitter and receiver of the radio unit, the antennas being designed and arranged to create a directional radiation pattern.

Preferably, the directional antennas are mounted on the vehicle so that their radiation patterns point two opposite directions, one of the two directional radiation patterns pointing the travelling direction of the vehicle.

Within the present description and claims and according to the customary use of the terms, with "directional antenna" or "directive antenna" it is meant an RF wireless antenna having a directional radiation pattern of a waves radiated from the antenna of relatively narrow angular width, for example of angular width of from few degrees to few tens of degrees.

Directional antennas that may be suitable in implementations of the present disclosure have a directional radiation pattern with a main lobe, which exhibits the higher field strength within a relatively narrow angular width, and minor lobes of lower field strength, the minor lobes including a back lobe in the opposite direction (180°) from the main lobe and typically major of the minor lobes.

The on-board mobile radio station may be mounted on a train and the pathway may be a rail track. Although embodiments in the more detailed description refer in particular to trains running on a rail track as a pathway, the disclosed solution can be generally applied in vehicle-to-ground systems where the vehicle may be a train, a car or a bus moving along a pathway, such as a rail track or a road line. A further example of vehicle is a ferry-boat sailing around a lake or along a section of the sea/lake coast, wherein a plurality of wayside fixed base stations is deployed along the coastline.

While there have been shown and described illustrative embodiments that provide for antenna keyhole management in wireless radio communication, it is to be understood that various other adaptations and modifications may be made within the spirit and scope of the embodiments herein. For example, while certain embodiments are described herein with respect to using certain wireless and/or wired communication protocols, such as Wi-Fi, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a mobile receiver of a mobile station in communication with a current base station of a plurality of base stations, hello packets from one or more base stations the plurality of base stations, each hello packet including a base station identifier that identifies which base station transmitted that packet;
   determining, based on the hello packets, signal strength values associated with each of the plurality of base stations;
   periodically analyzing the signal strength values associated with the current base station, to determine whether those signal strength values exceed a threshold value associated with the current base station; and
   when the current base station is associated with a signal strength value that exceeds the threshold value:
      flagging the current base station as a banned base station,
      selecting a neighboring base station of the current base station in the plurality of base stations as a new current base station, based on its associated signal strength values, and
      forcing a handoff of the mobile station from the banned base station to the new current base station at a handoff time.

2. The method as in claim 1, further comprising:
   setting a ban time duration for the banned base station; and
   unflagging the banned base station after expiration of the ban time duration.

3. The method as in claim 2, further comprising:
   flagging the banned base station as a last-banned base station after expiration of the ban time duration; and
   forcing a handoff of the mobile station to the last-banned base station, when the last-banned base station is associated with a highest signal strength value among the plurality of base stations.

4. The method as in claim 1, further comprising:
   maintaining communication with the current base station, when the current base station has a highest signal strength value among the plurality of base stations; and
   forcing a handoff of the mobile station from the current base station to a second base station in the plurality of base stations, when the second base station has the highest signal strength value among the plurality of base stations.

5. The method as in claim 1, wherein each of the plurality of base stations is configured to transmit radio signals to define a radio coverage area of radio communication such that the radio coverage area of adjacent base stations partially overlap.

6. The method as in claim 1, further comprising:
   calculating slope values versus time of a curve fitting signal strength values associated with the current base station;
   determining a slope singularity among the slope values, after flagging the current base station as a banned base station;
   associating an ingress point of time of high-loss transmission at the banned base station to the slope singularity;
   determining a new threshold value based on the ingress point of time; and
   replacing the threshold value with the new threshold value.

7. The method as in claim 6, wherein the new threshold value is based in part on a maximum signal strength value determined using the slope singularity.

8. The method as in claim 1, further comprising:
   repeatedly calculating a packet loss rate associated with the banned base station; and
   unflagging the banned base station when the packet loss rate associated with the banned base station is below a threshold loss rate.

9. An apparatus, comprising:
   one or more network interfaces to communicate with a plurality of base stations;
   a processor coupled to the one or more network interfaces and configured to execute one or more processes; and
   a memory configured to store a process that is executable by the processor, the process when executed configured to:
      receive hello packets from one or more base stations the plurality of base stations, each hello packet including a base station identifier that identifies which base station transmitted that packet;
      determining, based on the hello packets, signal strength values associated with each of the plurality of base stations;
      periodically analyzing the signal strength values associated with a current base station with which the apparatus communicates, to determine whether those signal strength values exceed a threshold value associated with the current base station; and
      when the current base station is associated with a signal strength value that exceeds the threshold value:
         flagging the current base station as a banned base station,
         selecting a neighboring base station of the current base station in the plurality of base stations as a new current base station, based on its associated signal strength values, and forcing a handoff from the banned base station to the new current base station at a handoff time.

10. The apparatus as in claim 9, wherein the process when executed is further configured to:

set a ban time duration for the banned base station; and unflag the banned base station after expiration of the ban time duration.

11. The apparatus as in claim 10, wherein the process when executed is further configured to:

flag the banned base station as a last-banned base station after expiration of the ban time duration; and force a handoff to the last-banned base station, when the last-banned base station is associated with a highest signal strength value among the plurality of base stations.

12. The apparatus as in claim 9, wherein the process when executed is further configured to:

maintain communication with the current base station, when the current base station has a highest signal strength value among the plurality of base stations; and force a handoff from the current base station to a second base station in the plurality of base stations, when the second base station has the highest signal strength value among the plurality of base stations.

13. The apparatus as in claim 9, wherein each of the plurality of base stations is configured to transmit radio signals to define a radio coverage area of radio communication such that the radio coverage area of adjacent base stations partially overlap.

14. The apparatus as in claim 9, wherein the process when executed is further configured to:

calculate slope values versus time of a curve fitting signal strength values associated with the current base station;

determine a slope singularity among the slope values, after flagging the current base station as a banned base station;

associate an ingress point of time of high-loss transmission at the banned base station to the slope singularity;

determine a new threshold value based on the ingress point of time; and replace the threshold value with the new threshold value.

15. The apparatus as in claim 14, wherein the new threshold value is based in part on a maximum signal strength value determined using the slope singularity.

16. The apparatus as in claim 9, wherein the process when executed is further configured to:

repeatedly calculate a packet loss rate associated with the banned base station; and unflag the banned base station when the packet loss rate associated with the banned base station is below a threshold loss rate.

17. The apparatus as in claim 9, wherein the apparatus is arranged on a vehicle traveling in a particular direction via a pathway along which the plurality of base stations is located.

18. The apparatus as in claim 17, wherein the one or more network interfaces comprise a first radio unit and a second radio unit arranged at a distances from one another along the vehicle.

19. The apparatus as in claim 17, wherein the vehicle is a train.

20. A tangible, non-transitory, computer-readable medium storing program instructions that cause a device to execute a process comprising:

receiving, at a mobile receiver of a mobile station in communication with a current base station of a plurality of base stations, hello packets from one or more base stations the plurality of base stations, each hello packet including a base station identifier that identifies which base station transmitted that packet;

determining, based on the hello packets, signal strength values associated with each of the plurality of base stations;

periodically analyzing the signal strength values associated with the current base station, to determine whether those signal strength values exceed a threshold value associated with the current base station; and when the current base station is associated with a signal strength value that exceeds the threshold value:

flagging the current base station as a banned base station, selecting a neighboring base station of the current base station in the plurality of base stations as a new current base station, based on its associated signal strength values, and forcing a handoff of the mobile station from the banned base station to the new current base station at a handoff time.

* * * * *

UNITED STATES PATENT AND TRADEMARK OFFICE
CERTIFICATE OF CORRECTION

PATENT NO. : 11,304,110 B2
APPLICATION NO. : 17/031317
DATED : April 12, 2022
INVENTOR(S) : Gaetano Catalli It is certified that error appears in the above-identified patent and that said Letters Patent is hereby corrected as shown below:

In the Specification

Column 1, Line 28, please amend as shown:
implies a reliable wireless ground-to-vehicle communi- Column 1, Line 64, please amend as shown:
link signal strength of wayside base stations Column 2, Line 33, please amend as shown:
the current base station as a banned base station, selects Column 4, Line 16, please amend as shown:
keyholes in wireless radio communication between an Column 4, Line 58, please amend as shown:
are connected to the wayside RU 31 through RF signal Column 6, Line 47, please amend as shown:
base stations of a mobile radio unit can be a sub-plurality Column 7, Line 59, please amend as shown:
emitted from a base station may be represented by an Column 8, Line 32, please amend as shown:
hello packets as an entry having the identity information Column 9, Line 34, please amend as shown:
ID-$M_1$   ID-$BS_3$   $RSSI_{13}$ Signed and Sealed this
Nineteenth Day of July, 2022

Katherine Kelly Vidal
*Director of the United States Patent and Trademark Office*

CERTIFICATE OF CORRECTION (continued)
U.S. Pat. No. 11,304,110 B2

Column 9, Line 48, please amend as shown:
slave processor may send the information on the $RSSI_{xy}$ Column 9, Line 51, please amend as shown:
eventually it will not receive hello packets from that base Column 10, Line 59, please amend as shown:
when moving antenna 19 at the back of the train moves Column 11, Line 34, please amend as shown:
in a way that a direct radio link with the excluded base Column 13, Line 14, please amend as shown:
(seconds) as measured by an on-board mobile radio Column 14, Line 31, please amend as shown:
tion of a RSSI exceeding a threshold signal strength value, Column 15, Line 2, please amend as shown:
unable to communicate with $BS_i$; due to keyhole Column 16, Line 18, please amend as shown:
may be determined by detecting when the negative slope Column 16, Line 57, please amend as shown:
weighing or predictive models in computing the instan- Column 18, Line 15, please amend as shown:
value associated with the slope singularity. In an embodi- Column 19, Line 16, please amend as shown:
their destination. The packet loss may be measured from Column 19, Line 47, please amend as shown:
the mobile RU and the banned base station is monitored Column 20, Line 20, please amend as shown:
time $t_{th}$ to determine the end of the ban for the current base Column 20, Line 64, please amend as shown:
loss evaluation in a transmission link between mobile RU Column 21, Line 30, please amend as shown:
phase (c) to the out-fall case (d) described with reference

CERTIFICATE OF CORRECTION (continued)
U.S. Pat. No. 11,304,110 B2

Column 22, Line 2, please amend as shown:
stations, the one or more neighbor base stations being Column 22, Line 45, please amend as shown:
mobile radio station, and in particular the one or more Column 23, Line 55, please amend as shown:
ban time duration.

Column 25, Line 38, please amend as shown:
and/or efficiently work in a number of train-to-ground Column 27, Line 26, please amend as shown:
one radio unit configured to receive hello packets from Column 28, Line 37, please amend as shown:
band or the 2.4 GHz band.